United States Patent
Sato

[11] Patent Number: 5,329,402
[45] Date of Patent: Jul. 12, 1994

[54] WIDE-ANGLE ZOOM LENS
[75] Inventor: Haruo Sato, Kawasaki, Japan
[73] Assignee: Nikon Corporation, Tokyo, Japan
[21] Appl. No.: 24,068
[22] Filed: Mar. 1, 1993
[30] Foreign Application Priority Data
  Mar. 5, 1992 [JP] Japan .................. 4-047445
[51] Int. Cl.$^5$ .......... G02B 15/14; G02B 3/02
[52] U.S. Cl. .......... 359/691; 359/677; 359/683; 359/717
[58] Field of Search .......... 359/691, 717, 677, 683
[56] References Cited

U.S. PATENT DOCUMENTS

| | | | |
|---|---|---|---|
| 4,155,629 | 5/1979 | Nakamura | 350/184 |
| 4,185,893 | 1/1980 | Ogawa et al. | 350/184 |
| 4,726,665 | 2/1988 | Itoh | 350/426 |
| 4,775,228 | 10/1988 | Ikemori et al. | 359/691 |
| 5,076,677 | 12/1991 | Sato | 359/691 |
| 5,155,629 | 10/1992 | Ito et al. | 359/691 |
| 5,175,649 | 12/1992 | Uzawa | 359/691 |

FOREIGN PATENT DOCUMENTS

| | | | |
|---|---|---|---|
| 3122228 | 3/1982 | Fed. Rep. of Germany | 359/691 |
| 0132207 | 8/1983 | Japan | 359/691 |
| 62-94812 | 5/1987 | Japan . | |
| 63-136013 | 6/1988 | Japan . | |
| 405093858 | 4/1993 | Japan | 359/691 |
| 2244819 | 12/1991 | United Kingdom | 359/691 |

OTHER PUBLICATIONS
Patent Abstracts of Japan, vol. 11, No. 303 (P-622), Oct., 1987.

Primary Examiner—Loha Ben
Assistant Examiner—Evelyn A. Lester
Attorney, Agent, or Firm—Shapiro and Shapiro

[57] ABSTRACT

A small-sized and bright wide-angle zoom lens having a variable power ratio on the order of 2 at a field angle of approximately 84° and constructed of a small number of constructional lens. The wide-angle zoom lens, sequentially from an object, comprises a first lens group having negative refracting power on the whole and a second lens group having positive refracting power on the whole, wherein a magnification is varied by altering an air space between the two lens groups. In this wide-angle zoom lens, the first lens group is constructed of, sequentially from the object, two pieces of negative meniscus lenses with their convex surfaces toward the object and a positive lens with its convex surface toward the object. At least one of the negative meniscus lenses is formed with an aspherical surface. The second lens group is constructed, sequentially from the object, two pieces of positive lenses, a negative lens and a positive lens. The zoom lens is further constructed to satisfy the various conditions.

29 Claims, 6 Drawing Sheets

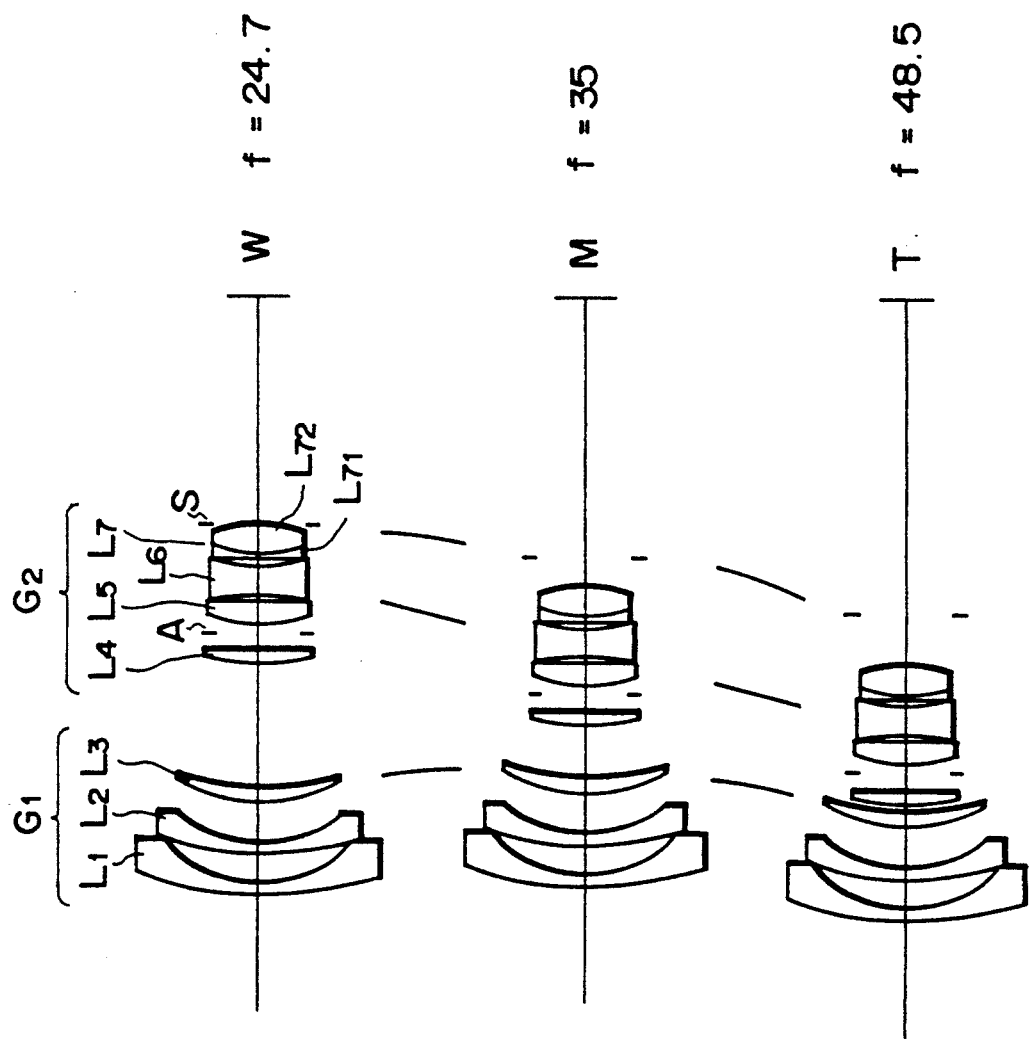

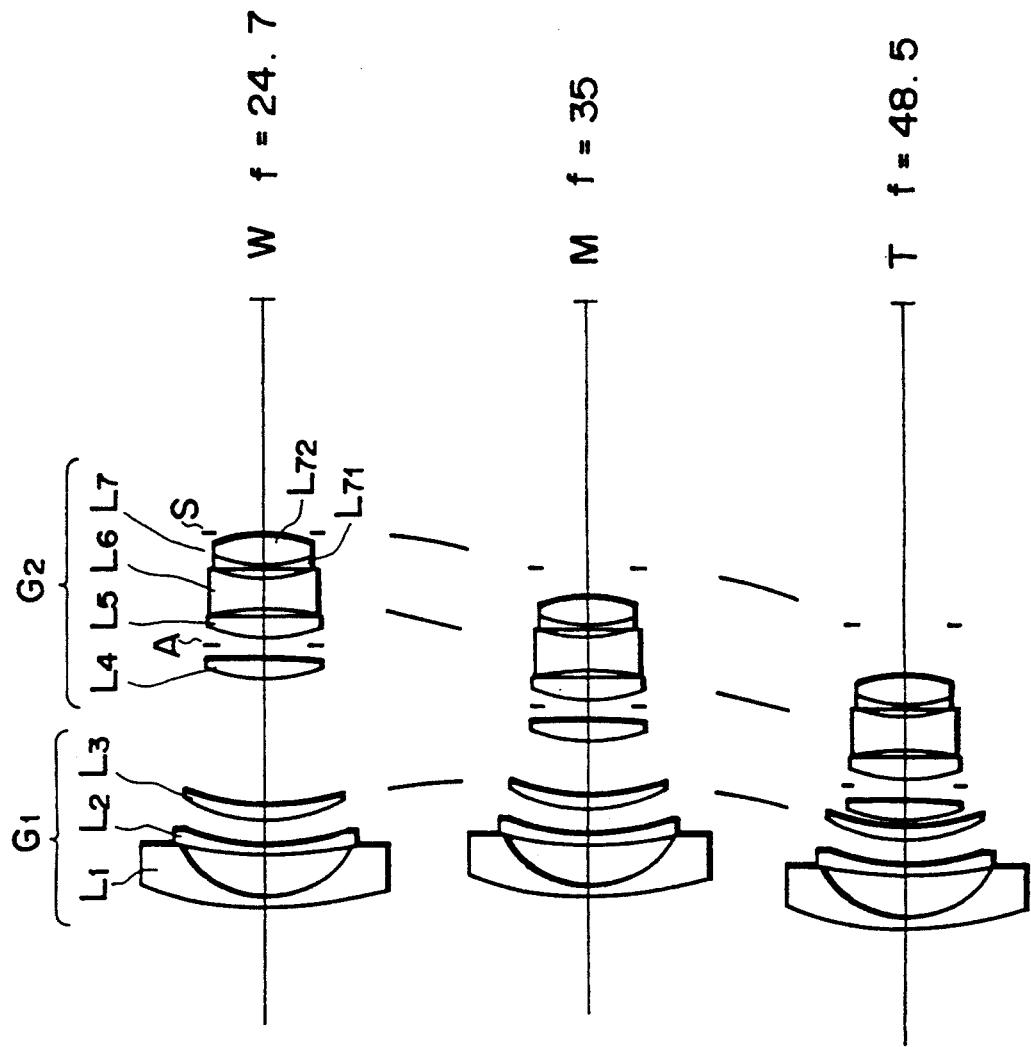

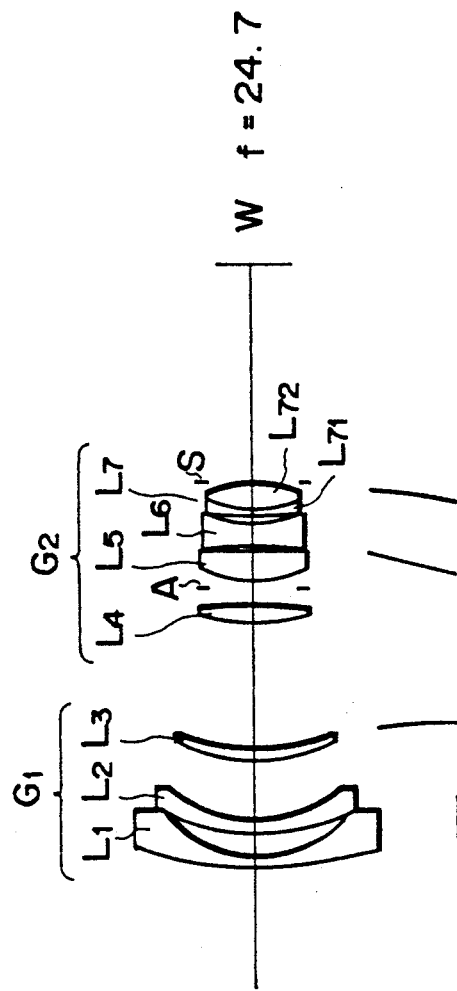
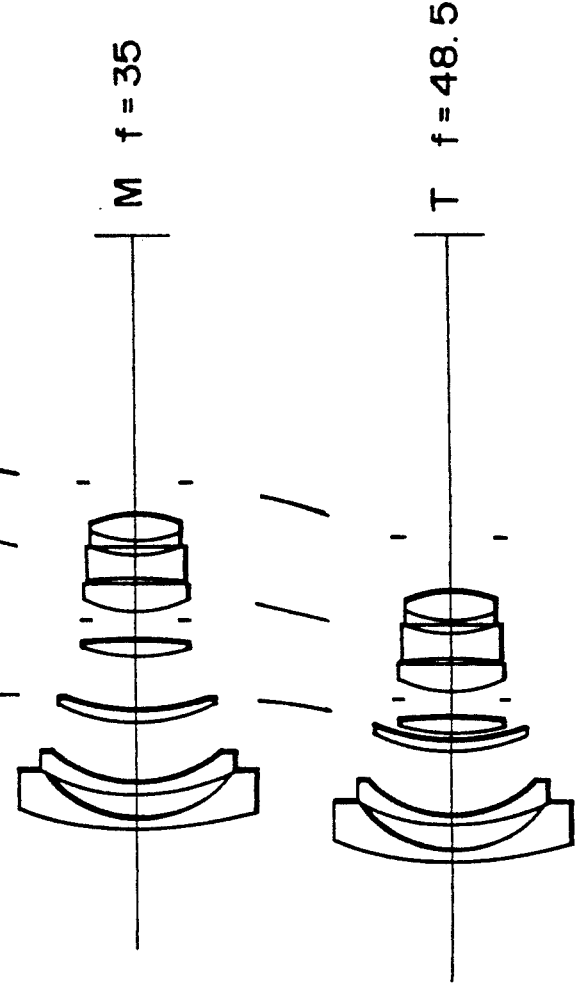
FIG. 4A  FIG. 4B  FIG. 4C

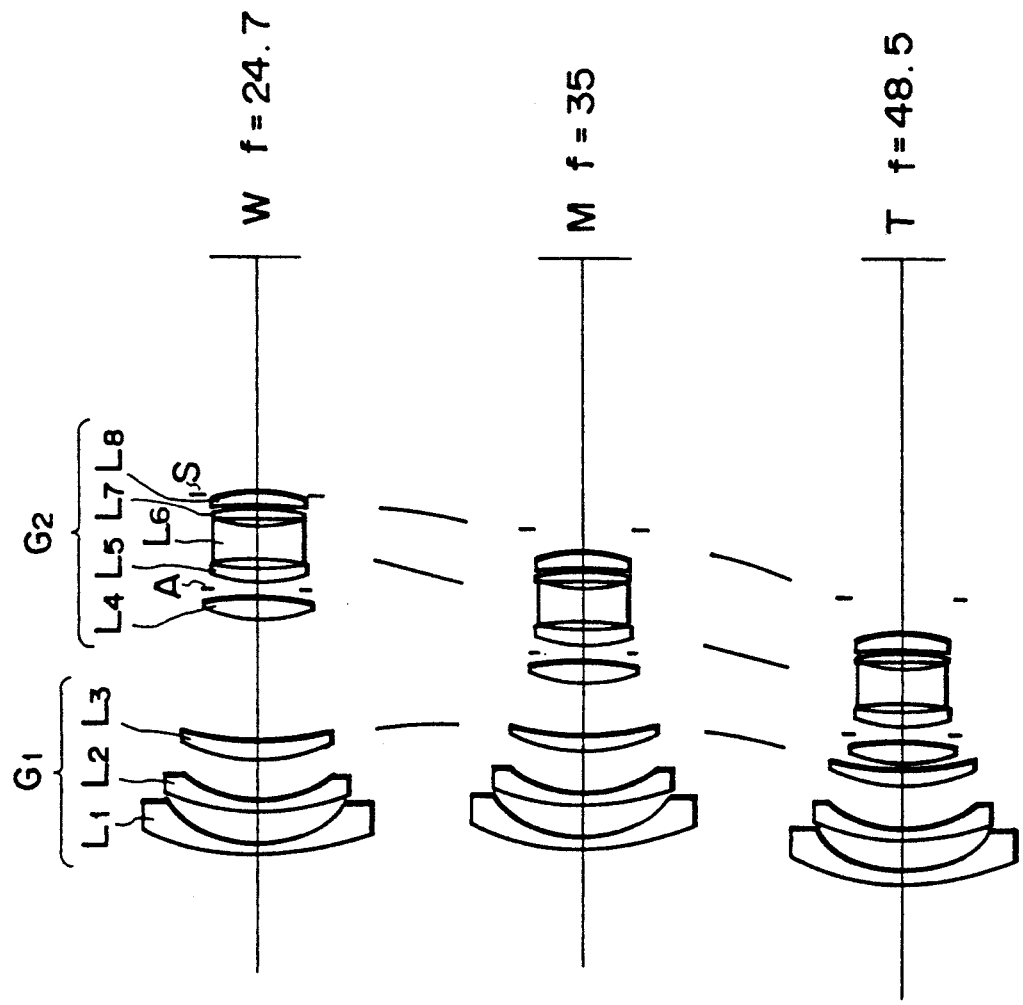

WIDE-ANGLE ZOOM LENS

BACKGROUND OF THE INVENTION

1. Field of the Invention

The present invention relates generally to a zoom lens and, more particularly, to a compact wide-angle zoom lens suitable for use with a 35 mm format camera.

2. Related Background Art

In recent years, a super wide-angle lens and a wide-angle lens employed as an interchangeable lens for a 35 mm format still camera have become smaller and smaller in size and higher and higher in performance. Especially for actualizing a small-sized wide-angle zoom lens at a low price, the optimum lens type is a so-called negative/positive two-group zoom lens. A variety of types have hitherto been proposed. Further, it has recently been possible to attain a miniaturization, a higher performance and a drop in costs by incorporating an aspherical lens surface. Examples of such known zoom lenses are shown in Japanese Patent Application Laid-open Nos. 62-94812 and 63-136013, and U.S. Pat. No. 5,076,677.

The wide-angle zoom lens disclosed in Japanese Patent Application Laid-open No. 62-94812 stated above, however, presents the following defect. This wide-angle zoom lens is, though small in the number of constructional lenses and also relatively small in total thickness of the lens system, relatively large in total length at the wide-angle end. A diameter of the front lens element increases. It is difficult to install a $\phi 52$ mm filter that has already been generalized as a standard filter size. The following is an additional defect. If forcibly installed, this brings about a remarkable reduction in amount of marginal rays at the wide-angle end. The principal ray having the maximum field angle is eclipsed during near distance photographing. Besides, in an aspect of aberrations also, it is insufficient to compensate a coma, an astigmatism and a curvature of field in the vicinity of the maximum field angle at the wide-angle end. It is also insufficient to compensate a chromatic aberration of magnification and a downward coma (hereafter called a [downward chromatic coma]) due to a difference between wavelengths of rays.

The super wide-angle zoom lens disclosed in Japanese Patent Application Laid-open No. 63-136013 stated above exhibits such an advantage that this zoom lens has the maximum field angle as large as 92° or more. The super wide-angle zoom lens is, however, constructed of a Great number of lenses and is large both in size and in diameter of the front lens element. This zoom lens is therefore insufficient in terms of reducing the size and the costs as well. A filter size is also large. Further, in the aspect of aberrations, the compensations of the curvature of field and the astigmatism are not enough from the wide-angle end to a state of intermediate focal length.

In addition, U.S. Pat. No. 5,076,677 by the same applicant as the one of the present invention discloses a small-sized wide-angle zoom lens having a field angle of approximately 76° at the wide angle and a small diameter of the front lens element. If the field angle at the wide-angle end increases up to as large as 84° with this lens construction, a total length at the wide-angle end outstandingly elongates. The diameter of the front lens element is also dilated, which in turn causes an increase in the filter size. Further, the amount of marginal rays is conspicuously reduced. Eventually, this conduces to a defect in which the eclipse occurs. Besides, in terms of aberrations, there are undesirably worsened particularly the curvature of field, the astigmatism, the downward coma, the downward chromatic coma and the distortion.

Hence, it is difficult to actualize the small-sized wide-angle zoom lens exhibiting a good performance with such refracting power arrangements and lens constructions of the known zoom lenses.

SUMMARY OF THE INVENTION

Accordingly, it is a primary object of the present invention, which obviates the defects inherent in the conventional wide-angle lenses, to provide a wide-angle zoom lens capable of being small in configuration and in filter size as well as being relatively small in the number of constructional lenses, though relatively large in the maximum field angle of approximately 84° at a variable power ratio on the order of 2. This wide-angle zoom lens is also capable of reducing the costs, exhibiting a favorable performance especially at the wide-angle end in terms of aberrations and having a large amount of marginal rays.

To accomplish the object described above, according to one aspect of the present invention, there is provided a wide-angle zoom lens, sequentially from an object, comprising: a first lens group having negative refracting power on the whole and constructed of two pieces of negative meniscus lenses with their convex surfaces toward the object, at least any one of the lenses being formed with an aspherical surface, and a positive lens with its convex surface toward the object; and a second lens group having positive refracting power on the whole and constructed of a plurality of lenses, wherein the first and second lens groups are constructed to vary a magnification by altering a space between the first and second lens groups and further to satisfy the following conditions:

$$0.65 < |f_1|/(f_W \cdot f_T)^{\frac{1}{2}} < 1.1$$

$$0.9 < f_2/|f_1| < 1.1$$

where
- $f_1$ : the focal length of the first lens group,
- $f_2$ : the focal length of the second lens group,
- $f_W$: the focal length of the whole system at the wide-angle, and
- $f_T$: the focal length of the whole system at the telephoto end.

Further, the second lens group includes a plurality of positive lenses and at least one negative lens, and the negative lens is constructed preferably to satisfy the following condition:

$$0.12 \leq t_6/D_2 \leq 0.4$$

where $D_2$ is the on-axis total thickness of the second lens group from the vertex of the closest-to-object surface to the vertex of the closest-to-image surface, and $t_6$ is the on-axis central thickness of the negative lens of the second lens group.

It is thus possible to compensate well a spherical aberration, an upward coma, etc. with no rise in weight.

Still further, the first lens group is constructed preferably to satisfy the following condition:

$$0.78 < f_{11}/f_1 < 2$$

where $f_1$ is the focal length of the first lens group, and $f_{11}$ is the focal length of the negative meniscus lens, positioned closest to the object, of the first lens group.

It is thus feasible to prevent worsening of the curvature of field and the astigmatism with respect to rays having a large field angle without increasing the diameter of the front lens element.

Other objects, advantages and effects of the present invention will become apparent during the following detailed discussion in conjunction with the accompany drawings.

BRIEF DESCRIPTION OF THE DRAWINGS

FIGS. 1A through 1C are views of lens geometries, each showing a lens arrangement and a shifting state during a process of variable power in a first embodiment of the present invention;

FIGS. 2A through 2C are views of lens geometries, each showing a lens arrangement and a shifting state during the process of variable power in a second embodiment of the present invention;

FIGS. 4A through 4C are views of lens geometries, each showing a lens arrangement and a shifting state during the process of variable power in a fourth embodiment of the present invention;

FIGS. 6A through 6C are views of lens geometries, each showing a lens arrangement and a shifting state during the process of variable power in a sixth embodiment of the present invention.

DESCRIPTION OF THE PREFERRED EMBODIMENTS

Figures 3A, 3B, 3C:
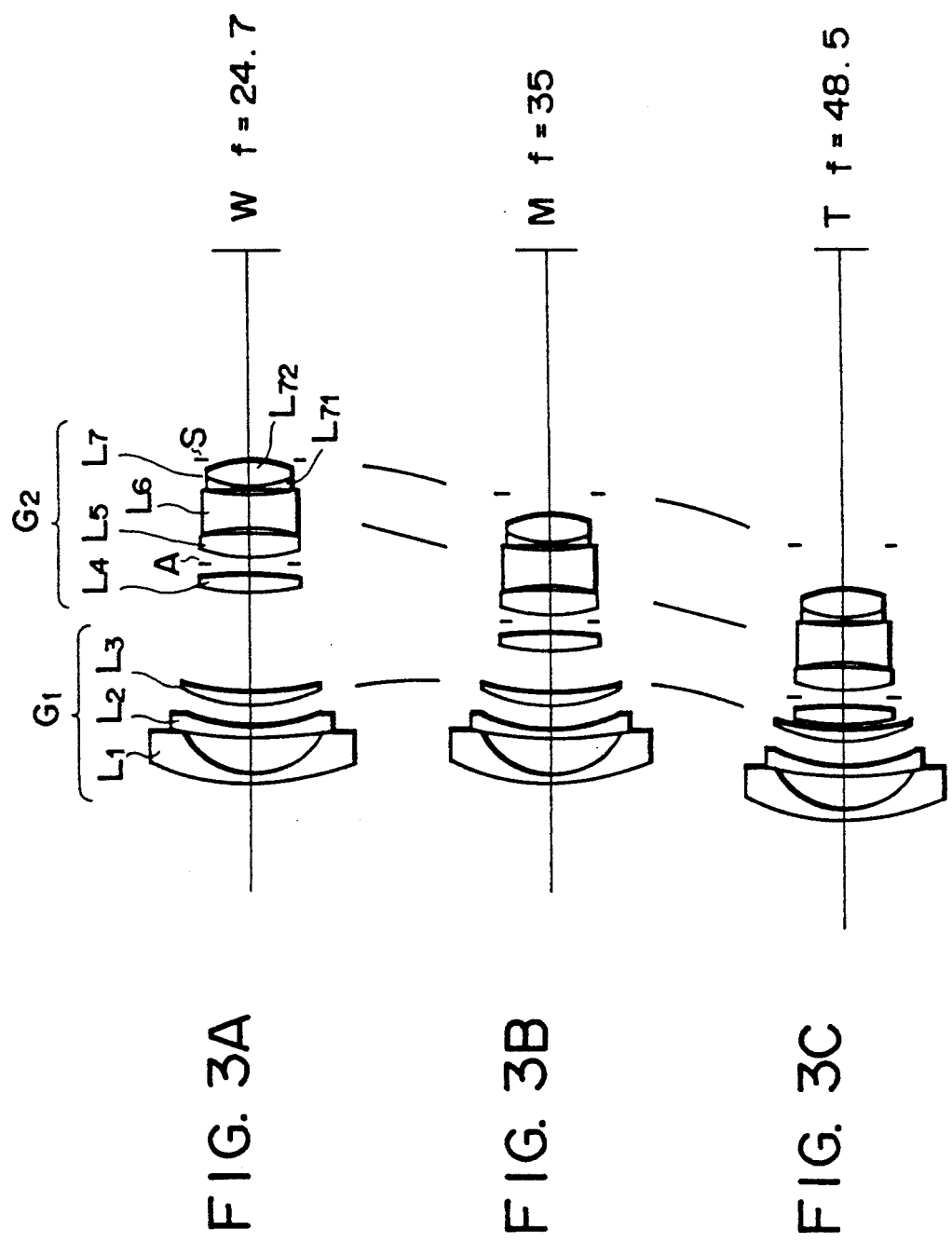
FIGS. 3A through 3C are views of lens geometries, each showing a lens arrangement and a shifting state during the process of variable power in a third embodiment of the present invention.

Embodiments of the present invention will hereafter be described in detail with reference to the accompanying drawings.

FIGS. 1A~1C through 6A~6C are views of lens geometries of a wide-angle zoom lens, each showing the embodiment of the present invention. Each wide-angle zoom lens comprises, sequentially from an object, a first lens group $G_1$ having negative refracting power on the whole and a second lens group $G_2$ having positive refracting power on the whole. The zoom lens is constructed to vary a magnification by altering an air space between the first and second lens groups $G_1$, $G_2$. Further, the first lens group $G_1$ is constructed of, sequentially from the object, a first negative meniscus lens $L_1$ with its convex surface toward the object, a second negative meniscus lens $L_2$ with its convex surface toward the object and a third positive meniscus lens $L_3$ with its convex surface toward the object. At least any one of the two negative meniscus lenses $L_1$, $L_2$ is formed with an aspherical surface. The second lens group $G_2$ constructed of a plurality of lenses includes, sequentially from the object, a fourth positive lens $L_4$, similarly a fifth positive lens $L_5$, a sixth negative lens $L_6$ and further at least one positive lens $L_7$.

Still further, the first and second lens groups $G_1$, $G_2$ are constructed to satisfy the following conditions:

$$0.65 < |f_1|/(f_W \cdot f_T)^{\frac{1}{2}} < 1.1 \qquad (1)$$

$$0.9 < f_2/|f_1| < 1.1 \qquad (2)$$

where
- $f_1$ : the focal length of the first lens group $G_1$,
- $F_2$ : the focal length of the second lens group $G_2$,
- $f_W$: the focal length of the whole system at the wide-angle, and
- $f_T$ : the focal length of the whole system at the telephoto end.

Next, the conditional formulae given above will be explained.

Generally, a negative/positive 2-group zoom lens is constructed in the following relationship:

$$f_1 = -(f_W \cdot f_T)^{\frac{1}{2}} \qquad (a)$$

where the $f_W$ is the focal length at the wide-angle end, $f_T$ is the focal length at the telephoto end, and $f_1$ is the focal length of the first negative lens group. In this case, total lengths thereof at the wide-angle end and the telephoto end are equal. A variation in the total length due to variable power is minimized. Hence, if the focal length of the first lens group is selected to deviate largely from this relationship, the variation in the total length due to the variable power disadvantageously remarkably increases. Further the following relationship is established:

$$f_T = f_1 \cdot \beta_T \qquad (b)$$

where $\beta_T$ is the magnification of the second positive lens group defined as a converging lens group at the telephoto end. It is required that the second positive lens group at the telephoto end be used in excess of life-size power to obtain compactness thereof. Besides, for satisfying the relational formulae (a) and (b) while compactly compensating well aberrations, it follows that each lens group is employed with relatively large refracting power. Accordingly, a tendency in the prior art is that each lens group is constructed of a multiplicity of lenses. This in turn leads to an increase in thickness of each lens group, thereby reducing an effect of miniaturization.

Unlike the prior art in which each lens group is constructed of a multiplicity of lenses, according to the present invention, for instance, a first lens group $G_1$ is constructed of three pieces of negative/negative/positive lenses as illustrated in FIGS. 1A, 1B and 1C. An arrangement of the refracting power is set suitable for the miniaturization in view of the relational formulae given above. Further, a filter size is reduced, and at the same time an amount of marginal rays is increased. Therefore, the foal length $f_1$ of the first negative lens group $G_1$ in the formula (a) is set relatively smaller than in the prior art to decrease a moving quantity of the first lens group $G_1$ during focalization.

Consequently, a small-sized wide-angle zoom lens is attained at low costs, wherein the variation in the total length due to the variable power is small, a sufficient amount of marginal rays are provided although the filter size is small, and the moving quantity of the focalizing group during the focalization is small.

Namely, the conditional formula (1) described above is related to the variation in the total length in an overall area of the variable power stated above. If a value of this formula exceeds 1.0, the total length at the wide-angle end reaches the maximum. Whereas if less than 1.0, the total length at the telephoto end reaches the maximum.

If over an upper limit of the conditional formula (1), the total length at the wide-angle end increases. As a result, an oblique ray incident on a front lens element and having the maximum field angle falls thereon farther away from the optical axis. This results in a dilation of diameter of the front lens element. A filter of a standard size can not be installed. Besides, if the diameter of the front lens element is forcibly reduced, this undesirably brings about a decrease in the amount of marginal rays. Further, there is caused a decline of the refracting power of the first lens group defined as the focalizing group that moves during focalizing. The moving quantity of the first lens group $G_1$ during the focalization therefore increases. The miniaturization is difficult because of a problem in terms of designing a lens barrel. Undesirably, this is also disadvantageous to shortening of a focalizing time when incorporating an autofocus mechanism. Whereas if under a lower limit of the conditional formula (1), this is advantageous to the reduction in diameter of the front lens element as well as to the miniaturization at the wide-angle end. However, the total length at the telephoto end is too elongate. The miniaturization is difficult in terms of designing the lens barrel. In an aspect of aberrations also, the refracting power of the first lens group $G_1$ outstandingly increases enough to cause a shift of Petzval's sum in a negative direction. Especially on the side of the wide-angle end, a curvature of field and an astigmatism are conspicuously deteriorated. A distortion also shifts largely towards a negative value. Further, a fluctuation in downward coma due to the variable power worsens. A chromatic coma also increases. Moreover, on the side of the telephoto end also, a spherical aberration goes worse, and hence the F-number has to be resultantly increased to obtain a good optical performance.

Hence, this range shown in the conditional formula (1) is desirable for actualizing the good optical performance with the construction having a less number of lenses. Then, if the upper limit is further set to 1.0 or under, this is advantageous to a reduction in the filter size. The effects of the present invention can be further enhanced.

A conditional formula (2) prescribes an optimum ratio of the focal length $f_2$ of the second lens group $G_2$ to the focal length $f_1$ of the first lens group $G_1$. By the way, the refracting power of the first lens group $G_1$ is set relatively large in accordance with the conditional formula (1). The conditional formula (2) can be therefore though of as a formula relative to the refracting power of the second lens group $G_2$ based thereon.

If over an upper limit of the conditional formula (2), the following two cases can be considered:

(1) a case where the focal length $|f_1|$ of the first lens group $G_1$ is small; and (2) a case where the focal length $f_2$ of the second lens group $G_2$ is large.

In the case (1), this undesirably induces a deterioration of the performance for the same reason as that when decreased under the lower limit of the conditional formula (1). While in the case (2), a back focus of the whole system increases. The total length of the whole lens system elongates, resulting in an undesirable increase in size.

Whereas if under a lower limit of the conditional formula (2), the following two cases can be considered:

(3) a case where the focal length of the first lens group $G_1$ is large; and (4) a case where the focal length of the second lens group $G_2$ is small.

In the case (3), this is unfavorable for the same reason as that when increased above the upper limit of the conditional formula (1). While in the case (4), the spherical aberration at the telephoto end worsens. A fluctuation in upward coma due to the variable power rises. An image-forming performance undesirably declines. Accordingly, this range is desirable. Note that if the lower limit of the conditional formula (2) is set to 0.93 or greater, there can be exhibited effects to attain a further miniaturization and a higher performance.

It is desirable that the second lens group $G_2$ be constructed to satisfy the following condition:

$$0.12 \leq t_6/D_2 \leq 0.4 \qquad (b\ 3)$$

where $t_6$ : the on-axis central thickness of the negative lens $L_6$ of the second lens group $G_2$, and $D_2$ : the on-axis total thickness of the second lens group $G_2$ from the vertex of the closest-to-object surface to the vertex of the closest-to-image surface.

A conditional formula (3) is related to a ratio of the on-axis central thickness $t_6$ of the thick negative lens $L_6$ of the second lens group $G_2$ to the on-axis total thickness $D_2$ of the second lens group $G_2$.

If over an upper limit of the conditional formula (3), the central thickness $t_6$ of the thick negative lens $L_6$ is remarkably larger than the on-axis total thickness $D_2$ of the second lens group $G_2$. A weight of the whole lens system unfavorably outstandingly augments. Besides, the thick negative lens $L_6$ typically involves the use of dense flint glass or lanthanum glass having an Abbe's number approximate thereto. A spectral transmittance is undesirably remarkably deteriorated. Whereas if under a lower limit of the conditional formula (3), it follows that the thick negative lens $L_6$ is thinned, and the spherical aberration gets worse. In the case of the small-sized wide-angle zoom lens having a small number of constructional lenses particularly in the present invention, the spherical aberration on the side of the telephoto end and an upward coma are hard to compensate.

While on the other hand, it is desirable that the first lens group $G_1$ be constructed to satisfy the following condition:

$$0.78 < f_{11}/f_1 < 2 \qquad (4)$$

where $f_{11}$ : the focal length of the negative meniscus lens $L_1$, positioned closest to the object, of the first lens group $G_1$ (however, the focal length of the negative meniscus lens $L_1$ conceived as a compound lens when the negative meniscus lens $L_1$ is a so-called compound lens of a glass material and a resinous material), and $f_1$ : the focal length of the first lens group $G_1$.

A conditional formula (4) prescribes a ratio of the focal length $f_{11}$ of the first negative meniscus lens $L_1$ to the focal length $f_1$ of the first lens group $G_1$.

If over an upper limit of the conditional formula (4), the focal length $f_{11}$ of the first negative meniscus lens $L_1$ becomes large with respect to the focal length $f_1$ of the first lens group $G_1$. That is, the refracting power of the first negative meniscus lens $L_1$ is weakened. Consequently, the oblique ray at the maximum field angle travels through a location far away from the optical axis. The diameter of the front lens element is therefore dilated, and disadvantageously the filter size increases. Whereas if under a lower limit of the conditional formula (4), the refracting power of the first negative meniscus lens $L_1$ is strikingly intensified. Accordingly, a difference (a curve of chromatic aberration of a magnification) of chromatic aberration of the magnification due to the field angle goes worse. The distortion also worsens. Then, there undesirably appears such a tendency that the astigmatism and the curvature of field with respect to the ray having a larger field angle are deteriorated by an influence of a higher-order aberration.

Still further, it is desirable that the first lens group $G_1$ be constructed to meet the following condition:

$$0.05 \leq d_{2-3}/|f_1| \leq 0.5 \quad (5)$$

where $d_{2-3}$ : the on-axis air space from the closer-to-image surface of the negative meniscus lens $L_2$ that is positioned in closer proximity to the image in the first lens group $G_1$ to the closer-to-object surface of the positive meniscus lens $L_3$ of the first lens group $G_1$ that is positioned just behind the negative meniscus lens $L_2$, and $f_1$ : the focal length of the first lens group $G_1$. A conditional formula (5) is related to the on-axis air space $d_{2-3}$ between the second negative meniscus lens $L_2$ and the third positive lens $L_3$ of the first lens group $G_1$.

If over an upper limit of the conditional formula (5), the on-axis air space $d_{2-3}$ becomes remarkably large. This conduces a reduction in variable space for the variable power between the first and second lens groups $G_1$, $G_2$. As a result, a mechanical interference on the telephoto side is disadvantageously caused. Whereas if under a lower limit thereof, there are increased the fluctuation in the downward coma due to the variable power and the difference because of the field angle. Then, undesirably the image-forming performance gets worse. Hence, this range is desirable.

Note that if the lower limit of the conditional formula (5) is set to 0.1 or greater, the effects inherent in the present invention can be exhibited.

Further, if the following conditions are met, more favorable results are obtainable.

$$0.1 < d_{2-3}/D_1 < 0.7 \quad (6)$$

$$0.2 < (t_5+t_6)/D_2 < 0.6 \quad (7)$$

$$-6 < q_{L2} < -1 \quad (8)$$

where $D_1$ : the on-axis total thickness of the first lens group $G_1$, $t_5$ : the on-axis central thickness of the positive lens $L_5$ of the second lens group $G_2$, $t_6$ : the on-axis central thickness of the negative lens $L_6$ of the second lens group $G_2$, $d_{2-3}$ : the on-axis air space from the vertex of the closer-to-image surface of the negative meniscus lens $L_2$ to the vertex of the closer-to-object surface of the positive meniscus lens $L_3$ of the first lens group $G_2$, $D_2$ : the on-axis total thickness of the second lens group $G_2$ from the vertex of the closest-to-object surface to the closest-to-image surface, and $q_{L2}$ : the configurational factor of the second negative meniscus lens $L_2$.

Note that the configurational factor $q_{L2}$ is obtained such as:

$$q_{L2}=(r_R+r_F)/(r_R-r_F)$$

where $r_F$ : the radius of curvature of the closer-to-object surface of the second negative meniscus lens $L_2$, and $r_R$ : the radius of curvature of the closer-to-image surface of the second negative meniscus lens $L_2$.

(However, when the second negative meniscus lens $L_2$ has an aspherical surface, a substitute calculation is performed with a paraxial radius of curvature of this aspherical surface.)

A conditional formula (6) prescribes the air space $d_{2-3}$ between the second negative meniscus lens $L_2$ and the third positive meniscus lens $L_3$. If over an upper limit of the conditional formula (6) the air space $d_{2-3}$ becomes outstandingly large as compared with the on-axis total thickness $D_1$ of the first lens group $G_1$. Diminished is the variable space for the variable power between the first lens group $G_1$ and the second lens group $G_1$. Undesirably, the mechanical interference takes place. Whereas if under a lower limit thereof, the air space $d_{2-3}$ becomes small as compared with the on-axis total thickness $D_1$ of the first lens group $G_1$. The downward comma is also disadvantageously hard to compensate.

A conditional formula (7) prescribes a ratio of sum of the central thickness $t_6$ of the thick negative lens $L_6$ of the second lens group $G_2$ and the central thickness $t_5$ of the positive lens $L_5$ disposed just before it with respect to the on-axis total thickness $D_2$ of the second lens group $G_2$. If in excess of an upper limit of the conditional formula (7), the result is separated into the following two cases (1) and (2):

(1) a case where the positive lens $L_5$ is remarkably thickened; and (2) a case where the thick negative lens $L_6$ is thickened.

In the case (1), the variable space for the variable power is reduced, with the result that the whole system becomes undesirably large. In the case (2), the weight strikingly increases on the whole for the same reason as that when exceeding the upper limit of the conditional formula (3). Besides, the spectral transmittance disadvantageously conspicuously worsens.

Whereas if under a lower limit of the conditional formula (7), the positive lens $L_5$ and the thick negative lens $L_6$ decrease in their thicknesses. It is therefore undesirably difficult to compensate especially the spherical aberration.

A conditional formula (8) prescribes the configurational factor $q_{L2}$ of the second negative meniscus lens $L_2$. If over an upper limit of the conditional formula (8), the configuration of the second negative meniscus lens $L_2$ changes from a plano-concave lens into a biconcave lens. Hence, in the optical system including the first lens Group $G_1$ having, though large in terms of field angle, the relatively large refracting power, there increases the space between the first negative meniscus lens $L_1$ and the second negative meniscus lens $L_2$. For this reason, not only the total length increases, but also the ray having a large filed angle on the side of the wide-angle end is conspicuously refracted. Consequently, a displacement of the curvature of field due to the field angle augments because of the influence of the higher-order aberration. The image-forming performance undesirably declines.

Note that if the upper limit of the conditional formula (8) is set to $-1.5$ or less, a more favorable image-forming performance can be obtained.

On the other hand, if under a lower limit of the conditional formula (8), a curvature in the meniscus configuration increases so much. This undesirably induces a ghost formed by a total reflection as well as causing a ghost having a high intensity. Then, in the aspect of the higher-order aberration, the downward coma unfavorably worsens because of an occurrence of the higher-order aberration.

By the way, the aspherical surface according to the present invention is employed mainly for compensating the distortion on the side of the wide-angle end, the curvature of field, the astigmatism and the downward coma. The aspherical surface is also, however, effecting in compensating the downward coma on the side of the telephoto end and the spherical aberration as well.

Then, as illustrated in the Figures, each of three pieces of negative/negative/positive lenses $L_1$, $L_2$, $L_3$ of the first lens group $G_1$ is formed in the meniscus configuration. The ray incident at a large field angle is not thereby refracted largely with respect to each lens of the first lens group $G_1$. The refracting power can be dispersed on each refracting surface of each lens. An amount of aberrations caused can be thus reduced. Hence, where a small-sized zoom lens is constructed of a small number of lenses to have a large field angle as in the present invention, it is desirable that each lens of the first lens group $G_1$ be, as shown in the Figures, formed in the meniscus configuration. Further, the second lens group $G_2$ is constructed of, sequentially from the object, the positive lens $L_4$, the positive lens $L_5$ and the thick negative lens $L_6$ which may be formed respectively as cemented lenses. Then, if the positive lens $L_7$ is formed as a cemented lens, the Petzval's sum can be improved. Even when this positive lens $L_7$ is separated, the compensation of the upward coma can be further improved. Moreover, the second lens group can be also constructed of cemented lenses and single lenses.

Next, the lens constructions in the respective embodiments will be explained in greater detail.

FIGS. 1A~1C are views depicting lens geometries in the first, second and third embodiments. The first lens group $G_1$ is constructed of, sequentially from the object, the first negative meniscus lens $L_1$ with its convex surface toward the object, the second negative meniscus lens $L_2$ with its convex surface toward the object and the third positive meniscus lens $L_3$ with its convex surface toward the object. The closer-to-image surface of the first negative meniscus lens $L_1$ is aspherical. Then, the second lens group $G_2$ is constructed of, sequentially from the object, the fourth biconvex positive lens $L_4$, the fifth biconvex positive lens $L_5$, the sixth biconcave negative lens $L_6$ and a seventh cemented positive lens $L_7$ consisting of a negative meniscus lens $L_{71}$ and a biconvex positive lens $L_{72}$.

However, the first negative meniscus lens $L_1$ in the first and second embodiments is a so-called compound aspherical surface lens composed of compound materials of a glass material and a resinous material.

FIGS. 4A~4C are views each illustrating a lens geometry in the fourth embodiment. The first lens group $G_1$ is constructed of, sequentially from the object, the first negative meniscus lens $L_1$ with its convex surface toward the object, the second negative meniscus lens $L_2$ with its convex surface toward the object and the third positive meniscus lens $L_3$ with its convex surface toward the object. The closer-to-object surface of the second negative meniscus lens $L_2$ is aspherical. Then, the second lens group $G_2$ is constructed of, sequentially from the object, the fourth biconvex positive lens $L_4$, the fifth biconvex positive lens $L_5$, the sixth biconcave negative lens $L_6$ and the seventh cemented positive lens $L_7$ consisting of the negative meniscus lens $L_{71}$ with its convex surface toward the object and the biconvex positive lens $L_{72}$.

Figure 5A:
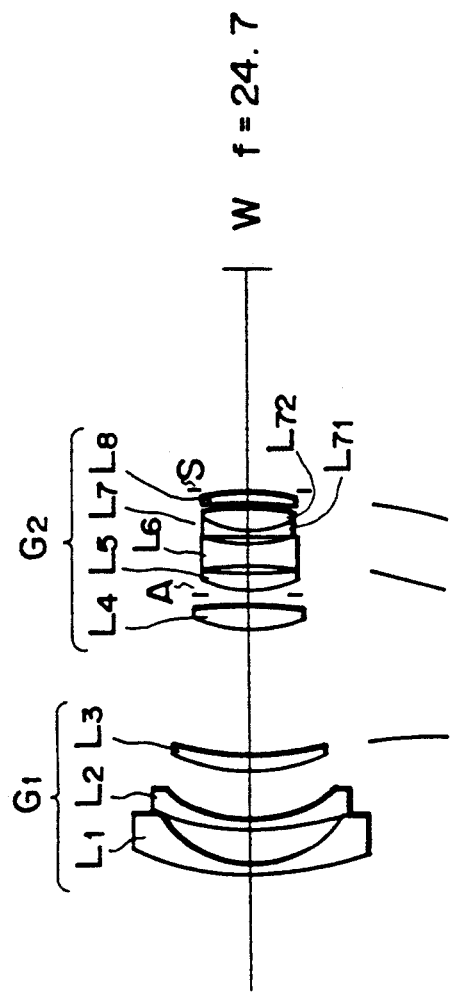
FIGS. 5A through 5C are views of lens geometries, each showing a lens arrangement and a shifting state during the process of variable power in a fifth embodiment of the present invention.
Figure 5B:
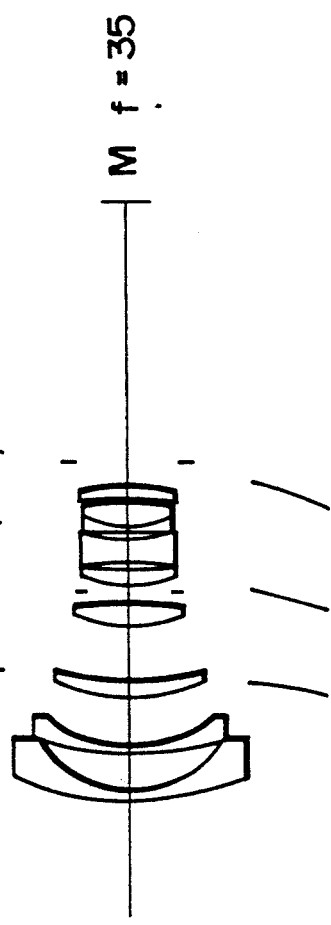
Figure 5C:
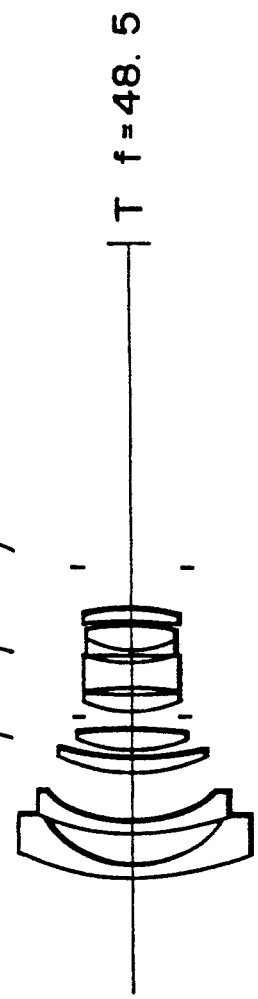

FIGS. 5A~5C are views each depicting a lens geometry in the fifth embodiment. The first lens group $G_1$ is constructed of, sequentially from the object, the first negative meniscus lens $L_1$ with its convex surface toward the object, the second negative meniscus lens $L_2$ with its convex surface toward the object and the third positive meniscus lens $L_3$ with its convex surface toward the object. The closer-to-object surface of the second negative meniscus lens $L_2$ is aspherical. Then, the second lens group $G_2$ is constructed of, sequentially from the object, the fourth biconvex positive lens $L_4$, the fifth positive meniscus lens $L_5$ with its convex surface toward the object, the sixth biconcave negative lens $L_6$, the seventh cemented positive lens $L_7$ consisting of the negative meniscus lens $L_{71}$ with its convex surface toward the object and the biconvex positive lens $L_{72}$ and an eighth positive meniscus lens $L_8$ with its convex surface toward the image.

FIGS. 6A~6C are views each showing a lens geometry in the sixth embodiment. The first lens group $G_1$ is constructed of, sequentially from the object, the first negative meniscus lens $L_1$ with its convex surface toward the object, the second negative meniscus lens $L$ with its convex surface toward the object and the third positive meniscus lens $L_3$ with its convex surface toward the object. The closer-to-object surface of the second negative meniscus lens $L_2$ is aspherical. Then, the second lens group $G_2$ is constructed of, sequentially from the object, the fourth biconvex positive lens $L_4$, the fifth positive meniscus lens $L_5$ with its convex surface toward the object, the sixth biconcave negative lens $L_6$, the seventh biconvex positive lens $L_7$ and the eighth positive meniscus lens $L_8$ with its convex surface toward the image.

Note that a stop closest to the image in the lens geometry in each embodiment is a fixed diameter stop S (a so-called flare stopper).

Incidentally, FIGS. 1A through 6A each show a lens arrangement at the wide-angle end. FIGS. 1B through 6B each show a lens arrangement in a state of the intermediate focal length. FIGS. 1C through 6C each show a lens arrangement at the telephoto end.

The following Tables 1~6 show values of items in the embodiments 1~6 of this invention. In Tables of the items in the embodiments, the symbol f is the focal length, $F_{NO}$ is the F-number, and $2\omega$ is the field angle.

Then, the numerals at the left end represent the order from the object side. The symbol r is the radius of curvature of the lens surface, d is the space between the lens surfaces. The refractive index n and the Abbe's number ν are values with respect to a d-ray (λ=587.6 nm).

Further, the aspherical surface shown by the value of the item is expressed by the following formula:

$$x = \frac{y^2/r}{1 + \{1 - (ky^2/r^2)\}^{\frac{1}{2}}} + c_2y^2 + c_4y^4 + c_6y^6 + c_8y^8 + c_{10}y^{10}$$

where x is the distance in the optical-axis direction from a tangent plane of the vertex of each aspherical surface at the height y from the optical axis in the perpendicular direction, r is the paraxial radius of curvature, k is the conical constant, and $c_n$ is the n-order aspherical surface coefficient.

TABLE 1

(First Embodiment)
f = 24.7~48.5
2ω = 84.5~48°
$F_{NO}$ = 3.6~4.6

| | r | d | ν | n |
|---|---|---|---|---|
| 1 | 61.180 | 1.80 | 60.0 | 1.64000 |
| 2 | 20.750 | .05 | 55.9 | 1.49712 |
| 3 | 17.844 | 5.00 | | |
| 4 | 46.626 | 1.80 | 53.9 | 1.71300 |
| 5 | 19.042 | 7.30 | | |
| 6 | 25.030 | 2.80 | 25.5 | 1.80458 |
| 7 | 40.504 | (d7) | | |
| 8 | 31.677 | 2.60 | 42.0 | 1.66755 |
| 9 | −310.911 | 4.55 | | |
| 10 | 21.893 | 4.30 | 55.6 | 1.69680 |
| 11 | −96.965 | .40 | | |
| 12 | −43.791 | 5.45 | 23.0 | 1.86074 |
| 13 | 20.581 | .90 | | |
| 14 | 56.236 | 1.00 | 43.3 | 1.84042 |
| 15 | 17.272 | 5.35 | 35.5 | 1.59507 |
| 16 | −21.414 | (d16) | | |
| 17 | .000 | (d17) | | |

(Variable Space in the Variable Power)

| F | 24.7000 | 35.0000 | 48.5000 |
|---|---|---|---|
| D0 | ∞ | ∞ | ∞ |
| d7 | 21.4418 | 9.2069 | 1.0401 |
| d16 | .0661 | 5.2230 | 9.2230 |
| d17 | 39.5235 | 44.3190 | 53.3635 |

(Aspherical Configuration of Third Surface)

k = .8583
$c_2$ = .0000
$c_4$ = −.80152 × $10^{-5}$
$c_6$ = −.49345 × $10^{-7}$
$c_8$ = .89054 × $10^{-10}$
$c_{10}$ = −.55232 × $10^{-12}$

Note that the condition corresponding values of the lens data given above are shown as below.

$|f_1|/(f_W \cdot f_T)^{\frac{1}{2}} = 0.942$ (1)

$f_2/|f_1| = 0.966$ (2)

$t_6/D_2 = 0.222$ (3)

$f_{11}/f_1 = 1.28$ (4)

$d_{2-3}/|f_1| = 0.224$ (5)

$d_{2-3}/D_1 = 0.389$ (6)

$(t_5+t_6)/D_2 = 0.397$ (7)

$q_{L2} = -2.38$ (8)

TABLE 2

(Second Embodiment)
f = 24.7~48.5
2ω = 84.5~48°
$F_{NO}$ = 4.1

| | r | d | ν | n |
|---|---|---|---|---|
| 1 | 60.532 | 1.60 | 57.5 | 1.67025 |
| 2 | 16.144 | .03 | 55.9 | 1.49712 |
| 3 | 16.116 | 7.50 | | |
| 4 | 64.557 | 1.80 | 60.0 | 1.64000 |
| 5 | 36.204 | 4.40 | | |
| 6 | 24.794 | 2.65 | 25.5 | 1.80458 |
| 7 | 36.340 | (d7) | | |
| 8 | 31.301 | 3.50 | 40.8 | 1.58144 |
| 9 | −124.152 | 3.40 | | |
| 10 | 22.569 | 4.00 | 50.2 | 1.72000 |
| 11 | −377.632 | .75 | | |
| 12 | −50.190 | 6.00 | 23.0 | 1.86074 |
| 13 | 20.303 | 1.10 | | |
| 14 | 52.134 | 1.00 | 43.3 | 1.84042 |
| 15 | 19.290 | 5.35 | 38.0 | 1.60342 |
| 16 | −22.094 | (d16) | | |
| 17 | .000 | (d17) | | |

(Variable Space in the Variable Power)

| F | 24.7000 | 35.0000 | 48.5000 |
|---|---|---|---|
| D0 | ∞ | ∞ | ∞ |
| d7 | 22.0776 | 9.4960 | 1.0978 |
| d16 | −.0952 | 5.1324 | 9.1324 |
| d17 | 40.1791 | 44.9393 | 54.0301 |

(Aspherical Configuration of Third Surface)

k = .8000
$c_2$ = .54982 × $10^{-2}$
$c_4$ = .22741 × $10^{-5}$
$c_6$ = −.20130 × $10^{-7}$
$c_8$ = .11281 × $10^{-9}$
$c_{10}$ = −.70654 × $10^{-12}$

Note that the condition corresponding values of the lens data given above are shown as below.

$|f_1|/(f_W \cdot f_T)^{\frac{1}{2}} = 0.953$ (1)

$f_2/|f_1| = 0.97$ (2)

$t_6/D_2 = 0.239$ (3)

$f_{11}/f_1 = 0.854$ (4)

$d_{2-3}/|f_1| = 0.133$ (5)

$d_{2-3}/D_1 = 0.245$ (6)

$(t_5+t_6)/D_2 = 0.398$ (7)

$q_{L2} = -3.55$ (8)

TABLE 3

(Third Embodiment)
f = 24.7~48.5
2ω = 84.5~48°
$F_{NO}$ = 4.1

| | r | d | ν | n |
|---|---|---|---|---|
| 1 | 44.902 | 1.70 | 60.0 | 1.64000 |
| 2 | 13.353 | 7.00 | | |
| 3 | 86.696 | 1.60 | 53.9 | 1.71300 |
| 4 | 28.240 | 4.38 | | |
| 5 | 24.798 | 2.70 | 25.5 | 1.80458 |
| 6 | 44.272 | (d6) | | |
| 7 | 42.509 | 3.50 | 42.0 | 1.66755 |
| 8 | −105.336 | 2.80 | | |
| 9 | 22.287 | 5.00 | 55.6 | 1.69680 |
| 10 | −58.354 | .40 | | |
| 11 | −38.206 | 6.50 | 23.0 | 1.86074 |
| 12 | 21.490 | .82 | | |

TABLE 3-continued (Third Embodiment)
$f = 24.7 \sim 48.5$
$2\omega = 84.5 \sim 48°$
$F_{NO} = 4.1$

| | | | | |
|---|---|---|---|---|
| 13 | 60.807 | 1.00 | 43.3 | 1.84042 |
| 14 | 16.783 | 5.00 | 35.5 | 1.59507 |
| 15 | −20.535 | (d15) | | |
| 16 | .000 | (d16) | | |

(Variable Space in the Variable Power)

| F | 24.7000 | 35.0000 | 48.5000 |
|---|---|---|---|
| D0 | ∞ | ∞ | ∞ |
| d6 | 18.3776 | 7.6546 | .4970 |
| d15 | .3180 | 4.4180 | 8.4180 |
| d16 | 39.2450 | 45.4448 | 54.9444 |

(Aspherical Configuration of Third Surface)

$k = .7550$
$c_2 = .0000$
$c_4 = .471396 \times 10^{-6}$
$c_6 = -.78795 \times 10^{-7}$
$c_8 = .636924 \times 10^{-9}$
$c_{10} = -.304615 \times 10^{-11}$ Note that the condition corresponding values of the lens data given above are shown as below.

$|f_1|/(f_W \cdot f_T)^{\frac{1}{2}} = 0.867$ (1)

$f_2/|f_1| = 1$ (2)

$t_6/D_2 = 0.26$ (3)

$f_{11}/f_1 = 1.011$ (4)

$d_{2-3}/|f_1| = 0.146$ (5)

$d_{2-3}/D_1 = 0.252$ (6)

$(t_5 + t_6)/D_2 = 0.46$ (7)

$q_{L2} = -1.97$ (8)

TABLE 4

(Fourth Embodiment)
$f = 24.7 \sim 48.5$
$2\omega = 84.6 \sim 48°$
$F_{NO} = 3.6 \sim 4.6$

| | r | d | ν | n |
|---|---|---|---|---|
| 1 | 64.926 | 1.80 | 60.0 | 1.64000 |
| 2 | 19.426 | 4.35 | | |
| 3 | 40.099 | 2.00 | 53.9 | 1.71300 |
| 4 | 19.352 | 11.00 | | |
| 5 | 27.036 | 2.65 | 25.5 | 1.80458 |
| 6 | 37.267 | (d6) | | |
| 7 | 31.830 | 3.00 | 42.0 | 1.66755 |
| 8 | −205.378 | 4.40 | | |
| 9 | 18.742 | 5.00 | 57.0 | 1.62280 |
| 10 | −320.505 | .50 | | |
| 11 | −67.481 | 4.50 | 23.0 | 1.86074 |
| 12 | 17.623 | 1.00 | | |
| 13 | 37.964 | 1.10 | 43.3 | 1.84042 |
| 14 | 15.381 | 4.80 | 35.5 | 1.59507 |
| 15 | −27.223 | (d15) | | |
| 16 | .000 | (d16) | | |

(Variable Space in the Variable Power)

| F | 24.7000 | 35.0000 | 48.5000 |
|---|---|---|---|
| D0 | ∞ | ∞ | ∞ |
| d6 | 21.5007 | 9.2658 | 1.0990 |
| d15 | .000 | 5.8608 | 9.8608 |
| d16 | 38.2274 | 42.3190 | 51.3635 |

(Aspherical Configuration of Third Surface)

$k = 1.0000$
$c_2 = .0000$
$c_4 = .81243 \times 10^{-5}$
$c_6 = .81922 \times 10^{-8}$

TABLE 4-continued (Fourth Embodiment)
$f = 24.7 \sim 48.5$
$2\omega = 84.6 \sim 48°$
$F_{NO} = 3.6 \sim 4.6$ $c_8 = .24302 \times 10^{-10}$
$c_{10} = .62192 \times 10^{-13}$ Note that the condition corresponding values of the lens data given above are shown as below.

$|f_1|/(f_W \cdot f_T)^{\frac{1}{2}} = 0.942$ (1)

$f_2/|f_1| = 0.966$ (2)

$t_6/D_2 = 0.185$ (3)

$f_{11}/f_1 = 1.349$ (4)

$d_{2-3}/|f_1| = 0.337$ (5)

$d_{2-3}/D_1 = 0.505$ (6)

$(t_5 + t_6)/D_2 = 0.391$ (7)

$q_{L2} = -2.87$ (8)

TABLE 5

(Fifth Embodiment)
$f = 24.7 \sim 48.5$
$2\omega = 84.6 \sim 48°$
$F_{NO} = 3.6 \sim 4.6$

| | r | d | ν | n |
|---|---|---|---|---|
| 1 | 49.528 | 1.80 | 58.5 | 1.65160 |
| 2 | 18.013 | 6.00 | | |
| 3 | 53.480 | 1.80 | 42.8 | 1.78900 |
| 4 | 21.021 | 8.63 | | |
| 5 | 28.412 | 2.95 | 25.5 | 1.73038 |
| 6 | 50.200 | (d6) | | |
| 7 | 22.967 | 4.00 | 42.0 | 1.66755 |
| 8 | −98.311 | 2.80 | | |
| 9 | 18.686 | 3.00 | 6.2 | 1.51835 |
| 10 | 97.910 | 1.10 | | |
| 11 | −45.477 | 4.0 | 23.0 | 1.86074 |
| 12 | 21.162 | 1.05 | | |
| 13 | 125.410 | 1.20 | 33.9 | 1.80384 |
| 14 | 14.200 | 4.75 | 35.7 | 1.62588 |
| 15 | −33.246 | .10 | | |
| 16 | −107.722 | 2.00 | 35.7 | 1.62588 |
| 17 | −31.922 | (d17) | | |
| 18 | .0000 | (d18) | | |

(Variable Space in the Variable Power)

| F | 24.7000 | 35.0000 | 48.5000 |
|---|---|---|---|
| D0 | ∞ | ∞ | ∞ |
| d6 | 21.3221 | 9.1347 | .9996 |
| d17 | −.0094 | 4.4906 | 7.4906 |
| d18 | 39.1406 | 44.9301 | 55.4163 |

(Aspherical Configuration of Third Surface)

$k = 1.0000$
$c_2 = .0000$
$c_4 = .83798 \times 10^{-5}$
$c_6 = -.88883 \times 10^{-8}$
$c_8 = .13278 \times 10^{-9}$
$c_{10} = -.22943 \times 10^{-12}$ Note that the condition corresponding values of the lens data given above are shown as below.

$|f_1|/(f_W \cdot f_T)^{\frac{1}{2}} = 0.925$ (1)

$f_2/|f_1| = 0.999$ (2)

$t_6/D_2 = 0.167$ (3)

$f_{11}/f_1 = 1.389$ (4)

$d_{2-3}/|f_1| = 0.27$ (5)

$d_{2-3}/D_1 = 0.407$ (6)

$(t_5+t_6)/D_2 = 0.292$ (7)

$q_{L2} = -2.3$ (8)

TABLE 6

(Fifth Embodiment)

f = 24.7~48.5
2ω = 84.6~48°
$F_{NO}$ = 3.6~4.6

| | r | d | ν | n |
|---|---|---|---|---|
| 1 | 45.810 | 1.80 | 53.9 | 1.71300 |
| 2 | 18.243 | 5.75 | | |
| 3 | 45.898 | 1.80 | 45.4 | 1.79668 |
| 4 | 19.530 | 7.50 | | |
| 5 | 25.613 | 2.95 | 25.5 | 1.73038 |
| 6 | 44.672 | (d6) | | |
| 7 | 23.234 | 3.75 | 40.8 | 1.58144 |
| 8 | −59.924 | 2.80 | | |
| 9 | 19.882 | 2.75 | 64.1 | 1.51680 |
| 10 | 65.539 | 1.30 | | |
| 11 | −31.979 | 6.00 | 23.8 | 1.84666 |
| 12 | 21.825 | 1.30 | | |
| 13 | 381.806 | 2.20 | 35.7 | 1.62588 |
| 14 | −32.643 | .10 | | |
| 15 | −95.422 | 2.40 | 41.4 | .1 57501 |
| 16 | −22.599 | (d16) | | |
| 17 | .000 | (d17) | | |

(Variable Space in the Variable Power)

| F | 24.7000 | 35.0000 | 48.5000 |
|---|---|---|---|
| D0 | ∞ | ∞ | ∞ |
| d6 | 21.3527 | 9.1653 | 1.0302 |
| d16 | −.4984 | 4.5016 | 6.5016 |
| d17 | 41.6407 | 46.9302 | 58.4145 |

(Aspherical Configuration of Third Surface)

k = 1.0000
$c_2$ = .0000
$c_4$ = .96783 × $10^{-5}$
$c_6$ = −.15935 × $10^{-7}$
$c_8$ = .16728 × $10^{-9}$
$c_{10}$ = −.25327 × $10^{-12}$

Note that the condition corresponding values of the lens data given above are shown as below.

$|f_1|/(f_W \cdot f_T)^{\frac{1}{2}} = 0.925$ (1)

$f_2/|f_1| = 0.999$ (2)

$t_6/D_2 = 0.265$ (3)

$f_{11}/f_1 = 1.366$ (4)

$d_{2-3}/|f_1| = 0.234$ (5)

$d_{2-3}/D_1 = 0.379$ (6)

$(t_5+t_6)/D_2 = 0.389$ (7)

$q_{L2} = -2.48$ (8)

It can be known from the values of the items in the respective embodiments discussed above that the lens system can be compactly constructed of a small number of constructional lenses in each embodiment. Then, although the attempt to obtain the wider angle is made to reach a field angle as large as approximately 84° at the maximum in each embodiment, the excellent image-forming performance is exhibited from the wide-angle end to the telephoto end.

Incidentally, the embodiments of the present invention adopt the following construction. The fixed diameter stop S (so-called fixed diameter stop) disposed in rear of the second lens group G2 for effectively shielding the off-axis marginal rays that cause a large upward aberration. This fixed diameter stop S moves along a moving trajectory different from that of the second lens group G2. Then, even if the fixed diameter stop S depicts whatever moving trajectory, as a matter of course, the marginal rays are to be effectively shielded. Moreover, a position of the aperture stop A is not limited to the position shown in the embodiments. The aperture stop A may be disposed just before the fourth positive lens L4 of the second lens group G2 or just before of the sixth thick biconcave negative lens L6.

As discussed above, according to the present invention, although the variable power ratio is on the order of 2 enough to obtain the field angle of about 84° at the maximum, it is possible to attain the wide-angle zoom lens that is small in size throughout the entire variable power area and in the attachment size of the filter or the like and exhibits the good image-forming performance with the simple construction.

It is apparent that, in this invention, a wide range of different working modes can be formed based on the invention without deviating from the spirit and scope of the invention. This invention is not restricted by its specific working modes except being limited by the appended claims.

What is claimed is:

1. A wide-angle zoom lens, sequentially from an object, comprising:
   a first lens group having negative refracting power on the whole and constructed of two pieces of negative meniscus lenses with their convex surfaces toward the object, at least any one of said lenses being formed with an aspherical surface, and a positive lens with a convex surface toward the object; and
   a second lens group having positive refracting power on the whole and constructed of a plurality of lenses,
   wherein said first and second lens groups move along the optical axis to alter a space therebetween for variable power and are constructed to further satisfy the following conditions:

$0.65 < |f_1|/(f_W \cdot f_T)^{\frac{1}{2}} < 1.1$ $0.9 < f_2/|f_1| < 1.1$ where
   $f_1$ : the focal length of said first lens group,
   $f_2$ : the focal length of said second lens group,
   $f_W$ : the focal length of the whole system at the wide-angle, and
   $f_T$ : the focal length of the whole system at the telephoto end.

2. The wide-angle zoom lens according to claim 1, wherein said second lens group includes a plurality of positive lenses and at least one negative lens, and said negative lens is constructed to satisfy the following condition:

$0.12 \leq t_6/D_2 \leq 0.4$ where $D_2$ is the on-axis total thickness of said second lens group from the vertex of the closest-to-object surface to the vertex of the closest-to-image surface, and $t_6$ is the on-axis central thickness of the negative lens of said second lens group.

3. The wide-angle zoom lens according to claim 1, wherein said first lens group is constructed to further satisfy the following condition:

$$0.78 < f_{11}/f_1 < 2$$

where $f_1$ is the focal length of said first lens group, and $f_{11}$ is the focal length of the negative meniscus lens, positioned closest to the object, of said first lens group.

4. The wide-angle zoom lens according to claim 1, wherein said first lens group is constructed to further satisfy the following condition:

$$0.05 \leq d_{2-3}/|f_1| \leq 0.5$$

where $f_1$ is the focal length of said first lens group, and $d_{2-3}$ is the on-axis air space from the vertex of the closer-to-image surface of a negative meniscus lens that is positioned closer to the image in said first lens group to the vertex of the closer-to-object surface of said positive lens of said first lens group that is positioned just behind said negative meniscus lens.

5. The wide-angle zoom lens according to claim 1, wherein said first lens group is constructed to further satisfy the following condition:

$$0.1 < d_{2-3}/D_2 < 0.7$$

where $D_1$ is the on-axis total thickness of said first lens group, and $d_{2-3}$ is the on-axis air space from the vertex of the closer-to-image surface of said negative meniscus lens that is positioned closer to the image in said first lens group to the vertex of the closer-to-object surface of said positive lens of said first lens group that is positioned just behind said negative meniscus lens.

6. The wide-angle zoom lens according to claim 1, wherein said second lens group includes a negative lens, two pieces of positive lenses positioned closer to the object than said negative lens and at least one positive lens positioned closer to the image than said negative lens, said second lens group being constructed to satisfy the following condition:

$$0.2 < (t_5+t_6)/D_2 < 0.6$$

where $t_5$: the on-axis central thickness of said closest-to-image positive lens of said two positive lenses positioned closer to the object than said negative lens of said second lens group, $t_6$: the on-axis central thickness of said negative lens of said second lens group, and $D_2$: the on-axis total thickness of said second lens group from the vertex of the closest-to-object surface to the closest-to-image surface.

7. The wide-angle zoom lens according to claim 1, wherein when a configurational factor $q_{L2}$ of a negative meniscus lens, positioned closest to the image, of said two negative meniscus lenses of said first lens group is expressed such as $q_{L2}=(r_R+r_F)/(r_R-r_F)$, said negative meniscus lens is constructed to satisfy the following condition:

$$-6 < q_{L2} < -1$$

where $r_F$: the radius of curvature of the closer-to-object surface of said lens, and $r_R$: the radius of curvature of the closer-to-image surface of said lens.

8. The wide-angle zoom lens according to claim 1, wherein said first and second lens groups are constructed to further satisfy the following conditions:

$$0.65 < |f_1|/(f_W \cdot f_T)^{\frac{1}{2}} < 1.0$$

$$0.93 < f_2/|f_1| < 1.1$$

where $f_1$: the focal length of said first lens group,
$f_2$: the focal length of said second lens group,
$f_W$: the focal length of the whole system at the wide-angle, and
$f_T$: the focal length of the whole system at the telephoto end.

9. The wide-angle zoom lens according to claim 4, wherein the on-axis air space $d_{2-3}$ is set to further satisfy the following condition:

$$0.1 \leq d_{2-3}/|f_1| \leq 0.5$$

where $f_1$ is the focal length of said first lens group, and $d_{2-3}$ is the on-axis air space from the vertex of the closer-to-image surface of a negative meniscus lens that is positioned closer to the image in said first lens group to the vertex of the closer-to-object surface of said positive lens of said first lens group that is positioned just behind said negative meniscus lens.

10. The wide-angle zoom lens according to claim 7, wherein the configurational factor $q_{L2}$ is set to further satisfy the following condition:

$$-6 = q_{L2} < -1.5$$

where $q_{L2}$ is the configurational factor of the second negative meniscus lens, positioned closest to the image, of said two negative meniscus lenses of said first lens group.

11. A wide-angle zoom lens, sequentially from an object, comprising:

a first lens group having negative refracting power on the whole and constructed of two pieces of negative meniscus lenses with their convex surfaces toward the object, at least any one of said lenses being formed with an aspherical surface, and a positive lens with a convex surface toward the object; and a second lens group having positive refracting power on the whole and constructed of two pieces of positive lenses, one negative lens and further at least one positive lens wherein said first and second lens groups move to alter a space therebetween for variable power and are constructed to further satisfy the following conditions:

$$0.65 < |f_1|/(f_W \cdot f_T)^{\frac{1}{2}} < 1.1$$

$$0.9 < f_2/|f_1| < 1.1$$

where $f_1$: the focal length of said first lens group,
$f_2$: the focal length of said second lens group,
$f_W$: the focal length of the whole system at the wide-angle, and $f_T$: the focal length of the whole system at the telephoto end.

12. The wide-angle zoom lens according to claim 11, wherein said second lens group is constructed to further satisfy the following condition:

$$0.12 \leq t_6/D_2 \leq 0.4$$

where $t_6$ is the on-axis central thickness of said negative lens of said second lens group, and $D_2$ is the on-axis total thickness of said second lens group from the vertex of the closest-to-object surface to the vertex of the closest-to-image surface.

13. The wide-angle zoom lens according to claim 11, wherein a first negative meniscus lens is constructed to further satisfy the following condition:

$$0.78 < f_{11}/f_1 < 2$$

where $f_1$ is the focal length of said first lens group, and $f_{11}$ is the focal length of the said first negative meniscus lens, positioned closest to the object, of said first lens group.

14. The wide-angle zoom lens according to claim 11, wherein said first lens group is constructed to further satisfy the following condition:

$$0.05 \leq d_{2-3}/|f_1| \leq 0.5$$

where $f_1$ is the focal length of said first lens group, and $d_{2-3}$ is the on-axis air space between a second negative meniscus lens positioned closer to the image in said first lens group and said positive lens of said first lens group that is positioned just behind said second negative meniscus lens.

15. The wide-angle zoom lens according to claim 11, wherein said first lens group is constructed to further satisfy the following condition:

$$0.1 < d_{2-3}/D_1 < 0.7$$

where $D_1$ is the on-axis total thickness of said first lens group, and $d_{2-3}$ is the on-axis air space between said second negative meniscus lens positioned closer to the image in said first lens group and said positive lens of said first lens group that is positioned just behind said second negative meniscus lens.

16. The wide-angle zoom lens according to claim 11, wherein said second lens group is constructed to satisfy the following condition:

$$0.2 < (t_5 + t_6)/D_2 < 0.6$$

where $t_5$ is the on-axis central thickness of a fifth positive lens, positioned closest to the image, of said two positive lenses positioned closer to the object than said negative lens of said second lens group, $t_6$ is the on-axis central thickness of said negative lens, and $D_2$ is the on-axis total thickness of said second lens group from the vertex of the closest-to-object surface to the closest-to-image surface.

17. The wide-angle zoom lens according to claim 11, wherein when configurational factor $q_{L2}$ of a second negative meniscus lens, positioned closest to the image, of said negative meniscus lenses of said first lens group is expressed such as $q_{L2} = (r_R + r_F)/(r_R - r_F)$, said second negative meniscus lens is constructed to satisfy the following condition:

$$-6 < q_{L2} < -1$$

where
  $r_R$: the radius of curvature of the closer-to-image surface of said lens, and
  $r_F$: the radius of curvature of the closer-to-object surface of said lens.

18. The wide-angle zoom lens according to claim 14, wherein the on-axis air space $d_{2-3}$ is set to further satisfy the following condition:

$$0.1 \leq d_{2-3}/|f_1| \leq 0.5$$

where $f_1$ is the focal length of said first lens group, and $d_{2-3}$ is the on-axis air space between said second negative meniscus lens positioned closer to the image in said first lens group and said positive lens of said first lens group that is positioned just behind said second negative meniscus lens.

19. The wide-angle zoom lens according to claim 17, wherein the configurational factor $q_{L2}$ of a negative meniscus lens, positioned closest to the image, of said two negative meniscus lenses of said first lens group is set to further satisfy the following condition:

$$-6 < q_{L2} < -1.5$$

20. The wide-angle zoom lens according to claim 1, wherein said first lens group is constructed of, sequentially from the object, a first negative meniscus lens with its convex surface toward the object to form an aspherical surface toward the image, a second negative meniscus lens with its convex surface toward the object and a third positive meniscus lens with its convex surface toward the object, and wherein said second lens group is constructed of, sequentially from the object, a fourth biconvex positive lens, a fifth biconvex positive lens, a sixth biconcave negative lens and a seventh positive lens obtained by cementing a negative meniscus lens with its convex surface toward the object and a biconvex lens.

21. The wide-angle zoom lens according to claim 1, wherein said first lens group is constructed, sequentially from the object, a first meniscus lens with its convex surface toward the object, a second negative meniscus lens with its convex surface toward the object to form an aspherical surface toward the object and a third positive meniscus lens with its convex surface toward the object, and wherein said second lens group is constructed of, sequentially from the object, a fourth biconvex positive lens, a fifth biconvex positive lens, a sixth biconcave negative lens and a seventh positive lens obtained by cementing a negative meniscus lens with its convex surface toward the object and a biconvex lens.

22. The wide-angle zoom lens according to claim 1, wherein said first lens group is constructed of, sequentially from the object, a first negative meniscus lens with its convex surface toward the object, a second negative meniscus lens with its convex surface toward the object to form an aspherical surface toward the object and a third positive meniscus lens with its convex surface toward the object, and wherein said second lens group is constructed of, sequentially from the object, a fourth biconvex positive lens, a fifth positive meniscus lens with its convex surface toward the object, a sixth biconcave negative lens, a seventh positive lens obtained by cementing a negative meniscus lens with is convex surface toward the object and a biconvex lens and an eighth positive meniscus lens with its convex surface toward the image.

23. The wide-angle zoom lens according to claim 1, wherein said first lens group is constructed of, sequentially from the object, a first negative meniscus lens with its convex surface toward the object, a second negative meniscus lens with its convex surface toward the object to form an aspherical surface toward the object and a third positive meniscus lens with its convex surface toward the object, and wherein said second lens group is constructed of, sequentially from the object, a fourth biconvex positive lens, a fifth positive meniscus lens with it convex surface toward the object, a sixth biconcave negative lens, a seventh biconvex positive lens and an eighth positive meniscus lens with its convex surface toward the image.

24. The wide-angle zoom lens according to claim 1, wherein said zoom lens is constructed in accordance with the following table of data:

| | f = 24.7~48.5 | | |
| | $2\omega$ = 84.6~48° | | |
| | $F_{NO}$ = 3.6~4.6 | | |
| | r | d | $\nu$ | n |
|---|---|---|---|---|
| 1 | 61.180 | 1.80 | 60.0 | 1.64000 |
| 2 | 20.750 | .05 | 55.9 | 1.49712 |
| 3 | 17.844 | 5.00 | | |
| 4 | 46.626 | 1.80 | 53.9 | 1.71300 |
| 5 | 19.042 | 7.30 | | |
| 6 | 25.030 | 2.80 | 25.5 | 1.80458 |
| 7 | 40.504 | (d7) | | |
| 8 | 31.677 | 2.60 | 42.0 | 1.66755 |
| 9 | −310.911 | 4.55 | | |
| 10 | 21.893 | 4.30 | 55.6 | 1.69680 |
| 11 | −96.965 | .40 | | |
| 12 | −43.791 | 5.45 | 23.0 | 1.86074 |
| 13 | 20.581 | .90 | | |
| 14 | 56.236 | 1.00 | 43.3 | 1.84042 |
| 15 | 17.272 | 5.35 | 35.5 | 1.59507 |
| 16 | −21.414 | (d16) | | |
| 17 | .000 | (d17) | | |
| (Variable Space in the Variable Power) | | | | |
| F | 24.7000 | 35.0000 | 48.5000 | |
| D0 | ∞ | ∞ | ∞ | |
| d7 | 21.4418 | 9.2069 | 1.0401 | |
| d16 | .0661 | 5.2230 | 9.2230 | |
| d17 | 39.5235 | 44.3190 | 53.3635 | |
| (Aspherical Configuration of Third Surface) | | | | |

$k$ = .8583
$c_2$ = .0000
$c_4$ = −.80152 × 10$^{-5}$
$c_6$ = −.49345 × 10$^{-7}$
$c_8$ = .89054 × 10$^{-10}$
$c_{10}$ = −.55232 × 10$^{-12}$ where the symbol f is the focal length, $F_{NO}$ is the F-number, and $2\omega$ is the field angle, the numerals at the left end then represent the order from the object side, the symbol r is the radius of curvature of the lens surface, d is the space between the lens surfaces, and the refractive index n and the Abbe's number $\nu$ are values with respect to a d-ray ($\lambda$=587.6 nm), and where t$_5$ : the on-axis central thickness of said positive lens of said second lens group, t$_6$ : the on-axis central thickness of said negative lens of said second lens group, D$_2$ : the on-axis total thickness of said second lens group from the vertex of the closest-to-object surface to the vertex of the closest-to-image surface, f$_{11}$ : the focal length of said negative meniscus lens positioned closest to the object in said first lens group, d$_{2-3}$ : the on-axis air space from the closer-to-image surface of said negative meniscus lens positioned closer to the image in said first lens group to the closer-to-object surface of said positive meniscus lens of said first lens group that is positioned just behind said negative meniscus lens, D$_1$ : the on-axis total thickness of said first lens group, and q$_{L2}$ : the configurational factor of said second negative meniscus lens (q$_{L2}$=(r$_R$+r$_F$)/(e$_R$−r$_F$); r$_F$: the radius of curvature of the closer-to-object surface of said second negative meniscus lens; and r$_R$ : the radius of curvature of the closer-to-image surface of said second negative meniscus lens), and wherein the aspherical surface shown by the values of the items is expressed by the following formula:

$$x = \frac{y^2/r}{1 + \{1 - (ky^2/r^2)\}^{\frac{1}{2}}} + c_2y^2 + c_4y^4 + c_6y^6 + c_8y^8 + c_{10}y^{10}$$

where x is the distance in the optical-axis direction from a tangent plane of the vertex of each aspherical surface at the height y from the optical axis in the perpendicular direction r is the paraxial radius of curvature, k is the conical constant, and $c_n$ is the n-order aspherical surface coefficient.

25. The wide-angle zoom lens according to claim 1, wherein said zoom lens is constructed in accordance with the following table of data:

| | f = 24.7~48.5 | | |
| | $2\omega$ = 84.5~48° | | |
| | $F_{NO}$ = 4.1 | | |
| | r | d | $\nu$ | n |
|---|---|---|---|---|
| 1 | 60.532 | 1.60 | 57.5 | 1.67025 |
| 2 | 16.144 | .03 | 55.9 | 1.49712 |
| 3 | 16.116 | 7.50 | | |
| 4 | 64.557 | 1.80 | 60.0 | 1.6400 |
| 5 | 36.204 | 4.40 | | |
| 6 | 24.794 | 2.65 | 25.5 | 1.80458 |
| 7 | 36.340 | (d7) | | |
| 8 | 31.301 | 3.50 | 40.8 | 1.58144 |
| 9 | −124.152 | 3.40 | | |
| 10 | 22.569 | 4.00 | 50.2 | 1.72000 |
| 11 | −377.632 | .75 | | |
| 12 | −50.190 | 6.00 | 23.0 | 1.86074 |
| 13 | 20.303 | 1.10 | | |
| 14 | 52.134 | 1.00 | 43.3 | 1.84042 |
| 15 | 19.290 | 5.35 | 38.0 | 1.60342 |
| 16 | −22.094 | (d16) | | |
| 17 | .000 | (d17) | | |
| (Variable Space in the Variable Power) | | | | |
| F | 24.7000 | 35.0000 | 48.5000 | |
| D0 | ∞ | ∞ | ∞ | |
| d7 | 22.0776 | 9.4960 | 1.0978 | |
| d16 | −.0952 | 5.1324 | 9.1324 | |
| d17 | 40.1791 | 44.9393 | 54.0301 | |
| (Aspherical Configuration of Third Surface) | | | | |

$k$ = .8000
$c_2$ = .54982 × 10$^{-2}$
$c_4$ = .22741 × 10$^{-5}$
$c_6$ = −.20130 × 10$^{-7}$
$c_8$ = .11281 × 10$^{-9}$
$c_{10}$ = −.70654 × 10$^{-12}$
(1) $| f_1 | / (f_w \cdot f_T)^{\frac{1}{2}}$ = 0.953
(2) $f_2 / | f_1 |$ = 0.97
(3) $t_6 / D_2$ = 0.239
(4) $f_{11} / f_1$ = 0.854
(5) $d_{2-3} / | f_1 |$ = 0.133
(6) $d_{2-3} / D_1$ = 0.245

-continued $$f = 24.7 \sim 48.5$$
$$2\omega = 84.5 \sim 48°$$
$$F_{NO} = 4.1$$

(7) $(t_5 + t_6) / D_2 = 0.398$
(8) $q_{L2} = -3.55$ where the symbol f is the focal length, $F_{NO}$ is the F-number, and $2\omega$ is the field angle, the numerals at the left end then represent the order from the object side, the symbol r is the radius of curvature of the lens surface, d is the space between the lens surfaces, and the refractive index n and the Abbe's number $\nu$ are values with respect to a d-ray ($\lambda$=587.6 nm), and where $t_5$: the on-axis central thickness of said positive lens of said second lens group,
  $t_6$: the on-axis central thickness of said negative lens of said second lens group,
  $D_2$: the on-axis total thickness of said second lens group from the vertex of the closest-to-object surface to the vertex of the closest-to-image surface,
  $f_{11}$: the focal length of said negative meniscus lens positioned closest to the object in said first lens group,
  $d_{2-3}$: the on-axis air space from the closer-to-image surface of said negative meniscus lens positioned closer to the image in said first lens group to the closer-to-object surface of said positive meniscus lens of said first lens group that is positioned just behind said negative meniscus lens,
  $D_1$: the on-axis total thickness of said first lens group, and
  $q_{L2}$: the configurational factor of said second negative meniscus lens ($q_{L2}=(r_R+r_F)/(r_R-r_F)$; $r_F$: the radius of curvature of the closer-to-object surface of said second negative meniscus lens; and $r_R$: the radius of curvature of the closer-to-image surface of said second negative meniscus lens), and and wherein the aspherical surface shown by the value of the item is expressed by the following formula:

$$x = \frac{y^2/r}{1 + \{1 - (ky^2/r^2)\}^{\frac{1}{2}}} + c_2 y^2 + c_4 y^4 + c_6 y^6 + c_8 y^8 + c_{10} y^{10}$$

where x is the distance in the optical-axis direction from a tangent plane of the vertex of each aspherical surface at the height y from the optical axis in the perpendicular direction r is the paraxial radius of curvature, k is the conical constant, and $c_n$ is the n-order aspherical surface coefficient.

26. The wide-angle zoom lens according to claim 1, wherein said zoom lens is constructed in accordance with the following table of data:

$$f = 24.7 \sim 48.5$$
$$2\omega = 84.5 \sim 48°$$
$$F_{NO} = 4.1$$

|    | r        | d     | $\nu$ | n       |
|----|----------|-------|-------|---------|
| 1  | 44.0902  | 1.70  | 60.0  | 1.64000 |
| 2  | 13.353   | 7.00  |       |         |
| 3  | 86.696   | 1.60  | 53.9  | 1.71300 |
| 4  | 28.240   | 4.38  |       |         |
| 5  | 24.798   | 2.70  | 25.5  | 1.80458 |
| 6  | 44.272   | (d6)  |       |         |
| 7  | 42.509   | 3.50  | 42.0  | 1.66755 |
| 8  | −105.336 | 2.80  |       |         |
| 9  | 22.287   | 5.00  | 55.6  | 1.69680 |
| 10 | −58.354  | .40   |       |         |
| 11 | −38.206  | 6.50  | 23.0  | 1.86074 |
| 12 | 21.490   | .82   |       |         |
| 13 | 60.807   | 1.00  | 43.3  | 1.84042 |
| 14 | 16.783   | 5.00  | 35.5  | 1.59507 |
| 15 | −20.535  | (d15) |       |         |
| 16 | .000     | (d16) |       |         |

(Variable Space in the Variable Power)

| F   | 24.7000 | 35.0000 | 48.5000 |
|-----|---------|---------|---------|
| d6  | 18.3776 | 7.6546  | .4970   |
| d15 | .3180   | 4.4180  | 8.4180  |
| d16 | 39.2450 | 45.4448 | 54.9444 |

(Aspherical Configuration of Third Surface)

$k = .7550$
$c_2 = .0000$
$c_4 = .471396 \times 10^{-6}$
$c_6 = -.78795 \times 10^{-7}$
$c_8 = .636924 \times 10^{-9}$
$c_{10} = -.304615 \times 10^{-11}$ (1) $|f_1| / (f_w \cdot f_T)^{\frac{1}{2}} = 0.867$
(2) $f_2 / |f_1| = 1$
(3) $t_6 / D_2 = 0.26$
(4) $f_{11} / f_1 = 1.011$
(5) $d_{2-3} / |f_1| = 0.146$
(6) $d_{2-3} / D_1 = 0.252$
(7) $(t_5 + t_6) / D_2 = 0.46$
(8) $q_{L2} = -1.97$ where the symbol f is the focal length, $F_{NO}$ is the F-number, and $2\omega$ is the field angle, the numerals at the left end then represent the order from the object side, the symbol r is the radius of curvature of the lens surface, d is the space between the lens surfaces, and the refractive index n and the Abbe's number $\nu$ are values with respect to a d-ray ($\lambda$=587.6 nm), and where $t_5$: the on-axis central thickness of said positive lens of said second lens group,
  $t_6$: the on-axis central thickness of said negative lens of said second lens group,
  $D_2$: the on-axis total thickness of said second lens group from the vertex of the closest-to-object surface to the vertex of the closest-to-image surface,
  $f_{11}$: the focal length of said negative meniscus lens positioned closest to the object in said first lens group,
  $d_{2-3}$: the on-axis air space from the closer-to-image surface of said negative meniscus lens positioned closer to the image in said first lens group to the closer-to-object surface of said positive meniscus lens of said first lens group that is positioned just behind said negative meniscus lens,
  $D_1$: the on-axis total thickness of said first lens group, and
  $q_{L2}$: the configurational factor of said second negative meniscus lens ($q_{L2}=(r_R+r_F)/(r_R-r_F)$; $r_F$: the radius of curvature of the closer-to-object surface of said second negative meniscus lens; and $r_R$: the radius of curvature of the closer-to-image surface of said second negative meniscus lens), and and wherein the aspherical surface shown by the value of the item is expressed by the following formula:

$$x = \frac{y^2/r}{1 + \{1 - (ky^2/r^2)\}^{\frac{1}{2}}} + c_2 y^2 + c_4 y^4 + c_6 y^6 + c_8 y^8 + c_{10} y^{10}$$

where x is the distance in the optical-axis direction from a tangent plane of the vertex of each aspherical surface at the height y from the optical axis in the perpendicular direction r is the paraxial radius of curvature, k is the conical constant, and $c_n$ is the n-order aspherical surface coefficient.

27. The wide-angle zoom lens according to claim 1, wherein said zoom lens is constructed in accordance with the following table of data:

| f = 24.7~48.5 |  |  |  |
|---|---|---|---|
| 2ω = 84.5~48° |  |  |  |
| $F_{NO}$ = 4.1 |  |  |  |
| r | d | ν | n |
| 1  64.926 | 1.80 | 60.0 | 1.64000 |
| 2  19.426 | 4.35 | | |
| 3  40.099 | 2.00 | 53.9 | 1.71300 |
| 4  19.352 | 11.00 | | |
| 5  27.036 | 2.65 | 25.5 | 1.80458 |
| 6  37.267 | (d6) | | |
| 7  31.830 | 3.00 | 42.0 | 1.66755 |
| 8  −205.378 | 4.40 | | |
| 9  18.742 | 5.00 | 57.0 | 1.62280 |
| 10  −320.505 | .50 | | |
| 11  −67.481 | 4.50 | 23.0 | 1.86074 |
| 12  17.623 | 1.00 | | |
| 13  37.964 | 1.10 | 43.3 | 1.84042 |
| 14  15.381 | 4.80 | 35.5 | 1.59507 |
| 15  −27.223 | (d15) | | |
| 16  .000 | (d16) | | |
| (Variable Space in the Variable Power) | | | |
| F | 24.7000 | 35.0000 | 48.5000 |
| D0 | ∞ | ∞ | ∞ |
| d6 | 21.5007 | 9.2658 | 1.0990 |
| d15 | .0000 | 5.8608 | 9.8608 |
| d16 | 38.2274 | 42.3190 | 51.3635 |
| (Aspherical Configuration of Third Surface) | | | |

$k = 1.0000$
$c_2 = .0000$
$c_4 = .81243 \times 10^{-5}$
$c_6 = .81922 \times 10^{-8}$
$c_8 = .24302 \times 10^{-10}$
$c_{10} = .62192 \times 10^{-13}$
(1) $|f_1| / (f_w \cdot f_T)^{\frac{1}{2}} = 0.942$
(2) $f_2 / |f_1| = 0.966$
(3) $t_6 / D_2 = 0.185$
(4) $f_{11} / f_1 = 1.349$
(5) $d_{2-3} / |f_1| = 0.337$
(6) $d_{2-3} / D_1 = 0.505$
(7) $(t_5 + t_6) / D_2 = 0.391$
(8) $q_{L2} = -2.87$ where the symbol f is the focal length, $F_{NO}$ is the F-number, and 2ω is the field angle, the numerals at the left end then represent the order from the object side, the symbol r is the radius of curvature of the lens surface, d is the space between the lens surfaces, and the refractive index n and the Abbe's number ν are values with respect to a d-ray (λ=587.6 nm), and where $t_5$: the on-axis central thickness of said positive lens of said second lens group, $t_6$: the on-axis central thickness of said negative lens of said second lens group, $D_2$: the on-axis total thickness of said second lens group from the vertex of the closest-to-object surface to the vertex of the closest-to-image surface, $f_{11}$: the focal length of said negative meniscus lens positioned closest to the object in said first lens group, $d_{2-3}$: the on-axis air space from the closer-to-image surface of said negative meniscus lens positioned closer to the image in said first lens group to the closer-to-object surface of said positive meniscus lens of said first lens group that is positioned just behind said negative meniscus lens, $D_1$: the on-axis total thickness of said first lens group, and $q_{L2}$: the configurational factor of said second negative meniscus lens ($q_{L2}=(r_R+r_F)/(r_R-r_F)$; $r_F$: the radius of curvature of the closer-to-object surface of said second negative meniscus lens; and $r_R$: the radius of curvature of the closer-to-image surface of said second negative meniscus lens), and and wherein the aspherical surface shown by the value of the item is expressed by the following formula:

$$x = \frac{y^2/r}{1 + \{1 - (ky^2/r^2)\}^{\frac{1}{2}}} + c_2 y^2 + c_4 y^4 + c_6 y^6 + c_8 y^8 + c_{10} y^{10}$$

where x is the distance in the optical-axis direction from a tangent plane of the vertex of each aspherical surface at the height y from the optical axis in the perpendicular direction r is the paraxial radius of curvature, k is the conical constant, and $c_n$ is the n-order aspherical surface coefficient.

28. The wide-angle zoom lens according to claim 1, wherein said zoom lens is constructed in accordance with the following table of data:

| f = 24.7~48.5 |  |  |  |
|---|---|---|---|
| 2ω = 84.6~48° |  |  |  |
| $F_{NO}$ = 3.6~4.6 |  |  |  |
| r | d | ν | n |
| 1  49.528 | 1.80 | 58.5 | 1.65160 |
| 2  18.013 | 6.00 | | |
| 3  53.480 | 1.80 | 42.8 | 1.78900 |
| 4  21.021 | 8.63 | | |
| 5  28.412 | 2.95 | 25.5 | 1.73038 |
| 6  50.200 | (d6) | | |
| 7  22.967 | 4.00 | 42.0 | 1.66755 |
| 8  −98.311 | 2.80 | | |
| 9  18.686 | 3.00 | 60.2 | 1.51835 |
| 10  97.910 | 1.10 | | |
| 11  −45.477 | 4.00 | 23.0 | 1.86074 |
| 12  21.162 | 1.05 | | |
| 13  125.410 | 1.20 | 33.9 | 1.80384 |
| 14  14.200 | 4.75 | 35.7 | 1.62588 |
| 15  −33.246 | .10 | | |
| 16  −107.722 | 2.00 | 35.7 | 1.62588 |
| 17  −31.922 | (d17) | | |
| 18  .000 | (d18) | | |
| (Variable Space in the Variable Power) | | | |
| F | 24.7000 | 35.0000 | 48.5000 |
| D0 | ∞ | ∞ | ∞ |
| d6 | 21.3221 | 9.1347 | .9996 |
| d17 | −.0094 | 4.4906 | 7.4906 |
| d18 | 39.1406 | 44.9301 | 55.4163 |
| (Aspherical Configuration of Third Surface) | | | |

$k = 1.0000$
$c_2 = .0000$
$c_4 = .83798 \times 10^{-5}$
$c_6 = .88883 \times 10^{-8}$
$c_8 = .13278 \times 10^{-9}$
$c_{10} = -.22943 \times 10^{-12}$
(1) $|f_1| / (f_w \cdot f_T)^{\frac{1}{2}} = 0.925$
(2) $f_2 / |f_1| = 0.999$
(3) $t_6 / D_2 = 0.167$
(4) $f_{11} / f_1 = 1.389$
(5) $d_{2-3} / |f_1| = 0.27$
(6) $d_{2-3} / D_1 = 0.407$
(7) $(t_5 + t_6) / D_2 = 0.292$
(8) $q_{L2} = -2.3$ where the symbol f is the focal length, $F_{NO}$ is the F-number, and 2ω is the field angle, the numerals at the left end then represent the order from the object side, the symbol r is the radius of curvature of the lens surface, d is the space between the lens surfaces, and the refractive index n and the Abbe's number $\nu$ are values with respect to a d-ray ($\lambda = 587.6$ nm), and where $t_5$: the on-axis central thickness of said positive lens of said second lens group, $t_6$: the on-axis central thickness of said negative lens of said second lens group, $D_2$: the on-axis total thickness of said second lens group from the vertex of the closest-to-object surface to the vertex of the closest-to-image surface, $f_{11}$: the focal length of said negative meniscus lens positioned closest to the object in said first lens group, $d_{2-3}$: the on-axis air space from the closer-to-image surface of said negative meniscus lens positioned closer to the image in said first lens group to the closer-to-object surface of said positive meniscus lens of said first lens group that is positioned just behind said negative meniscus lens, $D_1$: the on-axis total thickness of said first lens group, and $q_{L2}$: the configurational factor of said second negative meniscus lens ($q_{L2} = (r_R + r_F)/(r_R - r_F)$); $r_F$: the radius of curvature of the closer-to-object surface of said second negative meniscus lens; and $r_R$: the radius of curvature of the closer-to-image surface of said second negative meniscus lens), and and wherein the aspherical surface shown by the value of the item is expressed by the following formula:

$$x = \frac{y^2/r}{1 + \{1 - (ky^2/r^2)\}^{\frac{1}{2}}} + c_2 y^2 + c_4 y^4 + c_6 y^6 + c_8 y^8 + c_{10} y^{10}$$

where x is the distance in the optical-axis direction from a tangent plane of the vertex of each aspherical surface at the height y from the optical axis in the perpendicular direction r is the paraxial radius of curvature, k is the conical constant, and $c_n$ is the n-order aspherical surface coefficient.

29. The wide-angle zoom lens according to claim 1, wherein said zoom lens is constructed in accordance with the following table of data:

| | f = 24.7~48.5 | | |
| | 2ω = 84.6~48.1° | | |
| | $F_{NO}$ = 3.6~4.6 | | |
|---|---|---|---|
| | r | d | ν | n |
| 1 | 45.810 | 1.80 | 53.9 | 1.71300 |
| 2 | 18.243 | 5.75 | | |
| 3 | 45.898 | 1.80 | 45.4 | 1.79668 |
| 4 | 19.530 | 7.50 | | |
| 5 | 25.613 | 2.95 | 25.5 | 1.73038 |
| 6 | 44.672 | (d6) | | |
| 7 | 23.234 | 3.75 | 40.8 | 1.58144 |
| 8 | −59.924 | 2.80 | | |
| 9 | 19.882 | 2.75 | 64.1 | 1.51680 |
| 10 | 65.539 | 1.30 | | |
| 11 | −31.979 | 6.00 | 23.8 | 1.84666 |
| 12 | 21.825 | 1.30 | | |
| 13 | 381.806 | 2.20 | 35.7 | 1.62588 |
| 14 | −32.643 | .10 | | |
| 15 | −95.422 | 2.40 | 41.4 | 1.57501 |
| 16 | −22.599 | (d16) | | |
| 17 | .000 | (d17) | | |

(Variable Space in the Variable Power)

-continued

| f = 24.7~48.5 | | |
| 2ω = 84.6~48.1° | | |
| $F_{NO}$ = 3.6~4.6 | | |
|---|---|---|
| F | 24.7000 | 35.0000 | 48.5000 |
| D0 | ∞ | ∞ | ∞ |
| d6 | 21.3527 | 9.1653 | 1.0302 |
| d16 | −.4984 | 4.5016 | 6.5016 |
| d17 | 41.6407 | 46.9302 | 58.4145 |

(Aspherical Configuration of Third Surface)

k = 1.0000
$c_2$ = .0000
$c_4$ = .96783 × 10$^{-5}$
$c_6$ = −.15935 × 10$^{-7}$
$c_8$ = .16728 × 10$^{-9}$
$c_{10}$ = −.25327 × 10$^{-12}$ (1) $|f_1| / (f_w \cdot f_T)^{\frac{1}{2}} = 0.925$
(2) $f_2 / |f_1| = 0.999$
(3) $t_6 / D_2 = 0.265$
(4) $f_{11} / f_1 = 1.366$
(5) $d_{2-3} / |f_1| = 0.234$
(6) $d_{2-3} / D_1 = 0.379$
(7) $(t_5 + t_6) / D_2 = 0.389$
(8) $q_{L2} = -2.48$ where the symbol f is the focal length, $F_{NO}$ is the F-number, and 2ω is the field angle, the numerals at the left end then represent the order from the object side, the symbol r is the radius of curvature of the lens surface, d is the space between the lens surfaces, and the refractive index n and the Abbe's number $\nu$ are values with respect to a d-ray ($\lambda = 587.6$ nm), and where $t_5$: the on-axis central thickness of said positive lens of said second lens group, $t_6$: the on-axis central thickness of said negative lens of said second lens group, $D_2$: the on-axis total thickness of said second lens group from the vertex of the closest-to-object surface to the vertex of the closest-to-image surface, $f_{11}$: the focal length of said negative meniscus lens positioned closest to the object in said first lens group, $d_{2-3}$: the on-axis air space from the closer-to-image surface of said negative meniscus lens positioned closer to the image in said first lens group to the closer-to-object surface of said positive meniscus lens of said first lens group that is positioned just behind said negative meniscus lens, $D_1$: the on-axis total thickness of said first lens group, and $q_{L2}$: the configurational factor of said second negative meniscus lens ($q_{L2} = (r_R + r_F)/(r_R - r_F)$); $r_F$: the radius of curvature of the closer-to-object surface of said second negative meniscus lens; and $r_R$: the radius of curvature of the closer-to-image surface of said second negative meniscus lens), and and wherein the aspherical surface shown by the value of the item is expressed by the following formula:

$$x = \frac{y^2/r}{1 + \{1 - (ky^2/r^2)\}^{\frac{1}{2}}} + c_2 y^2 + c_4 y^4 + c_6 y^6 + c_8 y^8 + c_{10} y^{10}$$

where x is the distance in the optical-axis direction from a tangent plane of the vertex of each aspherical surface at the height y from the optical axis in the perpendicular direction r is the paraxial radius of curvature, k is the conical constant, and $c_n$ is the n-order aspherical surface coefficient.

* * * * *